(12) United States Patent
Matsumura et al.

(10) Patent No.: US 7,402,638 B2
(45) Date of Patent: Jul. 22, 2008

(54) PROPYLENE POLYMER PARTICLE METHOD OF PRODUCING THE SAME AND USE THEREOF

(75) Inventors: Shuji Matsumura, Takaishi (JP); Keita Itakura, Sodegaura (JP); Satoshi Hashizume, Takaishi (JP); Akihiro Inukai, Sodegaura (JP); Kouichirou Yamamoto, Sodegaura (JP); Ayako Kadosaka, Sodegaura (JP); Yoshio Sasaki, Takaishi (JP); Masashi Higuchi, Takaishi (JP); Hiroshi Nishikawa, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/568,964

(22) PCT Filed: Aug. 20, 2004

(86) PCT No.: PCT/JP2004/012331

§ 371 (c)(1),
(2), (4) Date: Feb. 21, 2006

(87) PCT Pub. No.: WO2005/019283

PCT Pub. Date: Mar. 3, 2005

(65) Prior Publication Data

US 2006/0222849 A1  Oct. 5, 2006

(30) Foreign Application Priority Data

Aug. 22, 2003 (JP) ............................ 2003-298335
May 21, 2004 (JP) ............................ 2004-152218
Jun. 18, 2004 (JP) ............................ 2004-181518
Jul. 20, 2004 (JP) ............................ 2004-211935

(51) Int. Cl.
*C08F 210/06* (2006.01)
*C08F 4/6592* (2006.01)
*B32B 27/08* (2006.01)

(52) U.S. Cl. ...................... 526/129; 526/142; 526/160; 526/165; 526/943; 502/103; 502/120; 502/126; 502/152; 428/407

(58) Field of Classification Search .................. 526/160, 526/165, 348, 129, 142, 943; 502/103, 120, 502/126, 152; 428/407
See application file for complete search history.

(56) References Cited

U.S. PATENT DOCUMENTS

| | | | |
|---|---|---|---|
| 4,316,966 A | 2/1982 | Mineshima et al. | |
| 5,731,254 A | 3/1998 | Winter et al. | |
| 5,916,988 A | 6/1999 | Tsutsui et al. | |
| 6,337,372 B1 | 1/2002 | Saito et al. | |
| 6,365,689 B1 * | 4/2002 | Ushioda et al. | 526/160 |
| 6,846,943 B2 * | 1/2005 | Nakano et al. | 556/53 |
| 6,878,787 B2 * | 4/2005 | Rauscher et al. | 526/160 |
| 6,939,928 B1 | 9/2005 | Kawai et al. | |

FOREIGN PATENT DOCUMENTS

| | | |
|---|---|---|
| EP | 0 674 668 B1 | 10/1995 |
| EP | 0 714 923 A1 | 6/1996 |
| EP | 1 138 687 A1 | 10/2001 |
| JP | 56-57814 A | 5/1981 |
| JP | 2-173015 A | 7/1990 |
| JP | 2-274703 A | 11/1990 |
| JP | 8-504457 A | 5/1996 |
| JP | 9-110934 A | 4/1997 |
| JP | 9-157320 A | 6/1997 |
| JP | 11-349634 A | 12/1999 |
| JP | 2000-212194 A | 8/2000 |
| JP | 2000-313716 A | 11/2000 |
| JP | 2000-327707 A | 11/2000 |
| WO | WO-00/08080 A1 | 2/2000 |
| WO | WO-01/27124 A1 | 4/2001 |

OTHER PUBLICATIONS

P. Galli, et al., "The Reactor Granule—A Unique Technology for the Production of a New Generation of Polymer Blends," Society of Plastics Engineers—Polyolefins VII International Conference, Houston, Texas, Feb. 24-27, 1991, pp. 27-44.

* cited by examiner

*Primary Examiner*—Caixia Lu
(74) *Attorney, Agent, or Firm*—Birch, Stewart, Kolasch & Birch, LLP

(57) ABSTRACT

The present invention relates to a propylene random copolymer which satisfies the following requirements [1] to [4], and to various useful molded products obtained by molding the propylene random copolymer:

[1] the concentration ($Pa$, % by mole) of a skeletal constituent derived from propylene (a), and the concentration ($Px$, % by mole) of a skeletal constituent derived from at least one olefin selected from ethylene (b) and α-olefins having 4 to 20 carbon atoms (c), each of which is contained in the propylene random copolymer, satisfy the following relational expressions (Eq-1) to (Eq-3):

$$85 \leq Pa < 100 \tag{Eq-1}$$

$$0 < Px \leq 15 \tag{Eq-2}$$

$$Pa + Px = 100; \tag{Eq-3}$$

[2] the concentration ($Pa$, % by mole) of the skeletal constituent derived from propylene (a) contained in the propylene random copolymer, and the melting point ($Tm$) measured with a differential scanning calorimeter satisfy the following relational expression (Eq-4):

$$135 - 4 \times (100 - Pa) < Tm < 165 - 4 \times (100 - Pa); \tag{Eq-4}$$

[3] the total amount of 2,1-bonded and 1,3-bonded non-stereoregular fractions is less than or equal to 0.2% by mole; and

[4] the amount of the n-decane ($nC_{10}$)-soluble fraction is less than or equal to 2.0% by weight.

16 Claims, 3 Drawing Sheets

10 μm

10 μm

1 μm

1 μm

PROPYLENE POLYMER PARTICLE METHOD OF PRODUCING THE SAME AND USE THEREOF

TECHNICAL FIELD

The present invention relates to a propylene random copolymer and use thereof, and more particularly, to a novel propylene random copolymer having a low melting point, a high molecular weight and a smaller amount of the normal decane-soluble fraction, a method for preparing the same, and a molded product obtained therefrom.

BACKGROUND ART

Propylene random copolymers have excellent physical properties and thus, they are used in a wide range of applications. For example, propylene random copolymers are widely used for packaging films; however, there are some cases in the packaging film applications where low temperature heat sealability is required. In order to improve the low temperature heat sealability, the melting point of the propylene random copolymers needs to be lowered. JP-A No. 2-173015 proposes a propylene random copolymer prepared from an aluminoxane and a hafnium compound whose ligand is a polydentate coordination compound in which two groups selected from an indenyl group, a substituted indenyl group and partially hydrogenated form thereof are bonded via a lower alkylene group. Even though the propylene random copolymer described in the publication certainly has a low melting point, the copolymer also has a problem that the anti-blocking property of a film obtained from the copolymer is poor due to the large amount of low-crystalline and low molecular weight fractions.

JP-A No. 9-110934 discloses a propylene random copolymer obtained from a chiral metallocene compound and an aluminoxane. According to the method described in the publication, a propylene random copolymer having a low melting point can be prepared, but there is a problem that atactic polymers are produced as side products in the presence of achiral mesomeric metallocenes that are produced as side products upon the production of chiral metallocene compounds. Therefore, there is a problem that a film obtained from the copolymer has the deteriorated anti-blocking property or the deteriorated haze after heat treatment.

JP-W No. 8-504457 proposes a low melting point propylene homopolymer having a smaller amount of the xylene-soluble fraction. However, since the polymer is a propylene homopolymer, a film obtained therefrom has poor impact resistance.

DISCLOSURE OF THE INVENTION

The present invention relates to a propylene random copolymer having improvements in the above-described aspects and a molded product obtained therefrom, and more particularly, to a propylene random copolymer having a low melting point, a high molecular weight and a smaller amount of the normal decane-soluble fraction, and a molded product such as films obtained from the copolymer.

Thus, the invention relates to:
a propylene random copolymer (Z), a propylene random copolymer particle (Z') having a specific morphology which constitutes one embodiment of the copolymer (Z), and a method for preparation thereof; and
a molded product such as films obtained from the propylene random copolymer (Z) or the propylene random copolymer particle (Z').

The propylene random copolymer (Z) according to an embodiment of the invention is a propylene random copolymer which simultaneously satisfies the following characteristics [1] to [4], and preferably a propylene random copolymer which simultaneously satisfies the characteristics [1] to [5]:

[1] the concentration (Pa, % by mole) of a skeletal constituent derived from propylene (a), and the concentration (Px, % by mole) of a skeletal constituent derived from at least one olefin selected from ethylene (b) and α-olefins having 4 to 20 carbon atoms (c), each of which is contained in the propylene random copolymer, satisfy the following relational expressions (Eq-1) to (Eq-3):

$$85 \leq Pa < 100 \tag{Eq-1}$$

$$0 < Px \leq 15 \tag{Eq-2}$$

$$Pa + Px = 100 \tag{Eq-3};$$

[2] the concentration (Pa, % by mole) of the skeletal constituent derived from propylene (a) that is contained in the propylene random copolymer, and the melting point (Tm) of the copolymer measured with a differential scanning calorimeter satisfy the following relational expression (Eq-4):

$$135 - 4 \times (100 - Pa) < Tm < 165 - 4 \times (100 - Pa) \tag{Eq-4};$$

[3] the total amount of 2,1-bonded and 1,3-bonded non-stereoregular fractions is less than or equal to 0.2% by mole; and

[4] the amount of the n-decane($nC_{10}$)-soluble fraction is less than or equal to 2.0% by weight.

A preferred embodiment of the propylene random copolymer (Z) of the invention is a propylene random copolymer satisfying the following requirement [5], in addition to the above-described requirements [1] to [4]:

[5] The melting point (Tm) determined by DSC is lower than or equal to 140° C.

The propylene random copolymer particle (Z') according to an embodiment of the invention is one embodiment of the above-described propylene copolymer. The particle is a propylene polymer particle having a trilayer structure consisting of a first skin layer [L1] that is present at the outermost crust, a second skin layer [L2] that is internally contacting with the first skin layer, and a core [L3] that is present inner to the second skin layer. It is also a propylene polymer particle characterized in that, in the transmission electron microscope (TEM) photograph (magnification ×4000) of an ultrathin section of the core [L3] after metal oxide staining, no stained component which has a particle diameter of 3 μm or greater is observed.

A preferred embodiment of the propylene polymer particle of the invention is a propylene polymer particle (Z") in which the first skin layer [L1] is made of polyethylene, the second skin layer [L2] is made of a polypropylene having a melting point (Tm) of 130° C. or higher as measured by DSC, and the core [L3] is made of a propylene homopolymer or a copolymer obtained from propylene and at least one olefin selected from ethylene and an α-olefin having 4 or more carbon atoms.

A more preferred embodiment of the propylene polymer particle of the invention is a propylene polymer particle (Z''') in which the polyethylene of the first skin layer has an intrinsic viscosity [η] of 3 (g/dl) or greater and a density of 910 (kg/m³) or greater, and the polypropylene of the second skin layer has an intrinsic viscosity [η] in the range of 0.5 to 5 (g/dl).

The propylene random copolymer particle (Z″) or (Z‴) can be obtained by sequentially carrying out the following three processes [P-1], [P-2] and [P-3] in the presence of a metallocene catalyst:

Process [P-1]: Process for preparing a polymer precursor [P$_1$] by polymerizing ethylene.

Process [P-2]: Process for preparing a prepolymer [P$_2$] by polymerizing propylene in an amount of 50 to 20,000 g/g-cat in the presence of the above-mentioned polymer precursor [P$_1$] at a temperature of 5 to 40° C.

Process [P-3]: Process for preparing a propylene polymer [P$_3$] by homopolymerizing propylene or by copolymerizing propylene with at least one olefin selected from ethylene and an α-olefin having 4 or more carbon atoms, in the presence of the prepolymer [P$_2$].

The polymer precursor [P$_1$] prepared in the aforementioned process [P-1] is preferably washed with an aliphatic or alicyclic hydrocarbon having 5 to 12 carbon atoms, and at least one process selected from the above-described process [P-1], process [P-2] and process [P-3] is preferably carried out in the presence of a polyoxyalkylene compound represented by the following formula [I]:

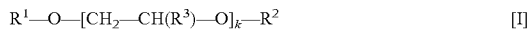

$$R^1—O—[CH_2—CH(R^3)—O]_k—R^2 \quad [I]$$

wherein $R^1$, $R^2$ and $R^3$ may be identical with or different from each other and are selected from a hydrogen atom, an alkyl group having 1 to 20 carbon atoms, an aryl group having 6 to 20 carbon atoms and an acyl group having 1 to 20 carbon atoms; and k represents the average number of repeating units and is in the range of 1 to 100.

Moreover, the process [P-2] according to an embodiment of the invention preferably employs a tubular reactor.

The metallocene catalyst used in the processes [P-1], [P-2] and [P-3] according to an embodiment of the invention is preferably a metallocene catalyst containing a metallocene compound represented by the following formula [II] as an essential component:

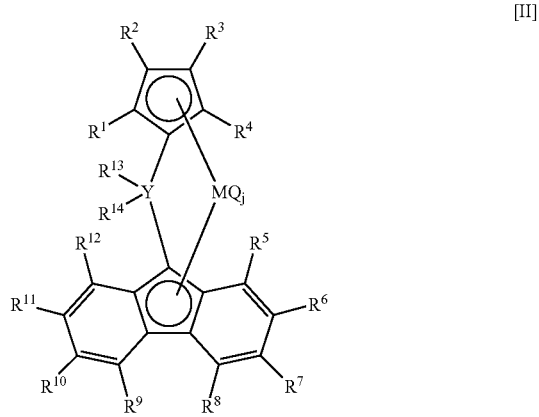

[II]

wherein $R^1$, $R^2$, $R^3$, $R^4$, $R^5$, $R^6$, $R^7$, $R^8$, $R^9$, $R^{10}$, $R^{11}$, $R^{12}$, $R^{13}$ and $R^{14}$ may be identical with or different from each other and are selected from hydrogen, a hydrocarbon group and a silicon-containing group; M is a transition metal belonging to Group 4; Y is a carbon atom or a silicon atom; Q may be selected from a halogen, a hydrocarbon group, an anionic ligand and a neutral ligand capable of coordination with a lone electron pair, combined in identical or different combinations; and j is an integer of 1 to 4.

The invention also relates to a molded product obtained from the propylene random copolymer, and in particular, to a sealant film, a shrink film or a shrink label.

According to the invention, a propylene random copolymer having a low melting point, a high molecular weight and a smaller amount of the n-decane-soluble fraction (i.e., a smaller amount of the low-crystalline fraction) can be obtained, and from this propylene random copolymer, various films and sheets having anti-blocking property and less deterioration in transparency after heat treatment, and highly transparent injection molded products, blow molded products and injection blow molded products can be obtained.

BEST MODE FOR CARRYING OUT THE INVENTION

Figure 1:
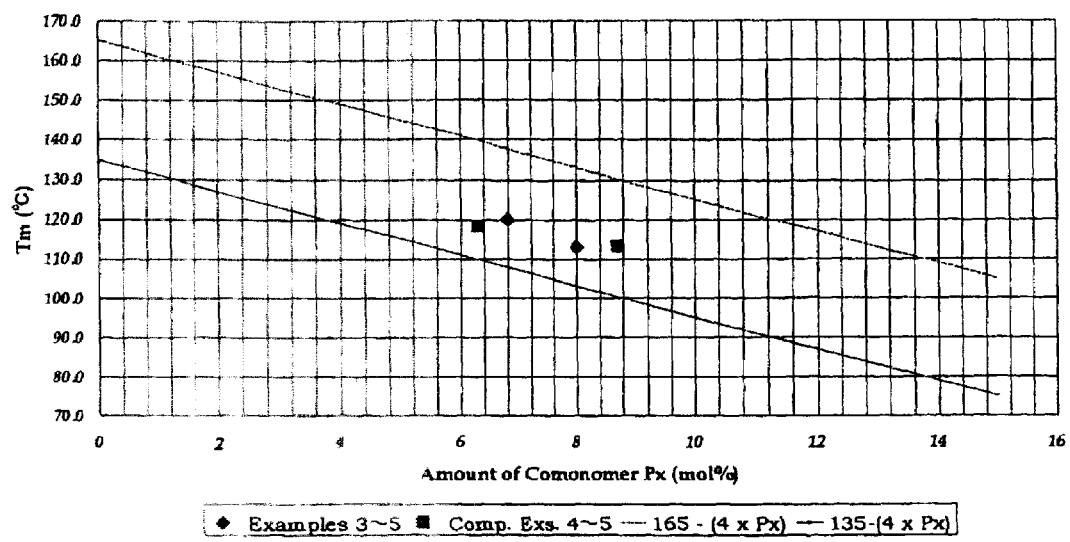
FIG. 1 is a diagram plotting the relationship between Px (the concentration of a skeletal constituent derived from at least one olefin selected from ethylene (b) and α-olefins having 4 to 20 carbon atoms (c), each of which is contained in the propylene random copolymer) and the melting point (Tm) of the propylene random copolymers obtained in Examples 3 to 5 according to the invention and Comparative Examples 4 and 5.

Hereinafter, the best modes for carrying out the present invention will be described in detail.

Propylene Random Copolymer (Z)

The propylene random copolymer (Z) of the invention is a propylene random copolymer which simultaneously satisfies the following requirements [1] to [4].

[1] The concentration (Pa, % by mole) of a skeletal constituent derived from propylene (a), and the concentration (Px, % by mole) of a skeletal constituent derived from at least one olefin selected from ethylene (b) and α-olefins having 4 to 20 carbon atoms (c), each of which is contained in the propylene random copolymer, satisfy the following relational expressions (Eq-1) to (Eq-3), preferably the following relational expressions (Eq-1') to (Eq-3'), and particularly preferably the following relational expressions (Eq-1″) to (Eq-3″):

$$85 \leq Pa < 100 \quad \text{(Eq-1)}$$

$$0 < Px \leq 15 \quad \text{(Eq-2)}$$

$$Pa + Px = 100 \quad \text{(Eq-3)}$$

$$85 \leq Pa \leq 99 \quad \text{(Eq-1')}$$

$$1 \leq Px \leq 15 \quad \text{(Eq-2')}$$

$$Pa+Px=100 \quad \text{(Eq-3')}$$

$$90 \leq Pa \leq 95 \quad \text{(Eq-1'')}$$

$$5 \leq Px \leq 10 \quad \text{(Eq-2'')}$$

$$Pa+Px=100 \quad \text{(Eq-3'')}$$

When Px exceeds 15% by mole, the propylene random copolymer shows a tendency of decreasing toughness, which is not desirable.

Examples of the α-olefin having 4 to 20 carbon atoms (c) used in the invention include 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene and the like. Among these, at least one selected from 1-butene, 1-hexene and 4-methyl-1-pentene is preferred.

[2] The concentration (Pa, % by mole) of the skeletal constituent derived from propylene (a) that is contained in the propylene random copolymer of the invention, and the melting point (Tm) of the copolymer measured with a differential scanning calorimeter (DSC) satisfy the following relational expression (Eq-4), and preferably the following relational expression (Eq-4'):

$$135-4\times(100-Pa)<Tm<165-4\times(100-Pa) \quad \text{(Eq-4)}$$

$$140-4\times(100-Pa)<Tm<165-4\times(100-Pa) \quad \text{(Eq-4')}$$

[3] The total amount of the non-stereoregular fraction attributable to 2,1-bonding and 1,3-bonding in the propylene random copolymer of the invention is less than or equal to 0.2% by mole, preferably less than or equal to 0.1% by mole, and more preferably less than or equal to 0.08% by mole. When the amount of the non-stereoregular fraction exceeds 0.2% by mole, low-crystalline fractions increase in the propylene random copolymer. Although propylene usually forms head-to-tail bonded propylene chains through 1,2-bonding (the methylene moiety binds with a catalyst) upon polymerization, propylene occasionally forms 2,1-bonding or 1,3-bonding. Propylene which is intercalated through 2,1-bonding and 1,3-bonding forms non-stereoregular units in the polymer. The concentration of the 2,1-bonded and 1,3-bonded fractions of propylene among the polymer constituent units can be easily calculated from the $^{13}$C-NMR spectrum, based on the disclosures of Polymer, 30, 1350 (1989) or JP-A No. 7-145212.

[4] The amount of the n-decane ($nC_{10}$)-soluble fraction occupying the propylene random copolymer of the invention is 2.0% by weight or less, preferably 1.0% by weight or less, and more preferably 0.5% by weight or less. The amount of this n-decane-soluble fraction is an index closely related to the blocking properties of the propylene random copolymer or the molded product obtained therefrom, and a smaller amount of the n-decane-soluble fraction usually means a smaller amount of the low-crystalline fraction. As such, the propylene random copolymer of the invention has very good anti-blocking property. It can be also confirmed by cross fractionation chromatography that the propylene random copolymer of the invention has a smaller amount of the low-crystalline fraction. Specifically, according to the measurement by cross fractionation chromatography (CFC), the amount of the fraction eluted with o-dichlorobenzene (ODCB) at 40° C. or lower is 2.0% by weight or less, preferably 1.0% by weight or less, and more preferably 0.5% by weight or less. When the amount of the fraction eluted with ODCB at 40° C. or lower exceeds 2.0% by weight, the amount of the low-crystalline fraction in the propylene random copolymer increases, and thus there often arise problems such as deterioration in the anti-blocking property of the resulting film and deterioration in the transparency of the film after heat treatment.

The propylene random copolymer (Z) of the invention preferably satisfies the following requirement [5], in addition to the aforementioned requirements [1] to [4].

[5] The propylene random copolymer (Z) according to an embodiment of the invention has a melting point (Tm) of 140° C. or lower as determined by DSC, preferably 95 to 140° C., more preferably 100 to 130° C., and particularly preferably 100 to 120° C. When the melting point exceeds 140° C., the heat seal temperature may increase in the case of utilizing the propylene random copolymer (Z) of the invention in the molded products such as films, which is not desirable.

The melt flow rate (MFR) of the propylene random copolymer (Z) of the invention at 230° C. under a load of 2.16 kg is not limited, as long as the propylene random copolymer (Z) exhibits the optimum MFR in accordance with the use. In other words, when MFR is 30 (g/10 min) or lower, the propylene random copolymer can be used for various molding applications without causing any problem, which is desirable. However, to be more specific, the MFR is preferably 40 (g/10 min) or less for injection molding applications, the MFR is preferably 20 (g/10 min) or less for film applications, and the MFR is preferably 2 (g/10 min) or less for blow molding applications or sheet applications.

Furthermore, with regard to the molecular weight distribution (Mw/Mn) of the propylene random copolymer (Z) of the invention as determined by gel permeation chromatography (GPC), when the copolymer (Z) is applied to film molded products where transparency is required, such as sealant films or shrink films, a copolymer having a Mw/Mn of 1.0 to 4.0, and preferably 1.0 to 3.0, is usually preferably employed; while in the film applications where transparency is not required or in molded products other than films, a copolymer having a Mw/Mn of greater than 4.0 may be also preferably employed.

Propylene Random Copolymer Particles [(Z') to (Z''')]

Figure 4:
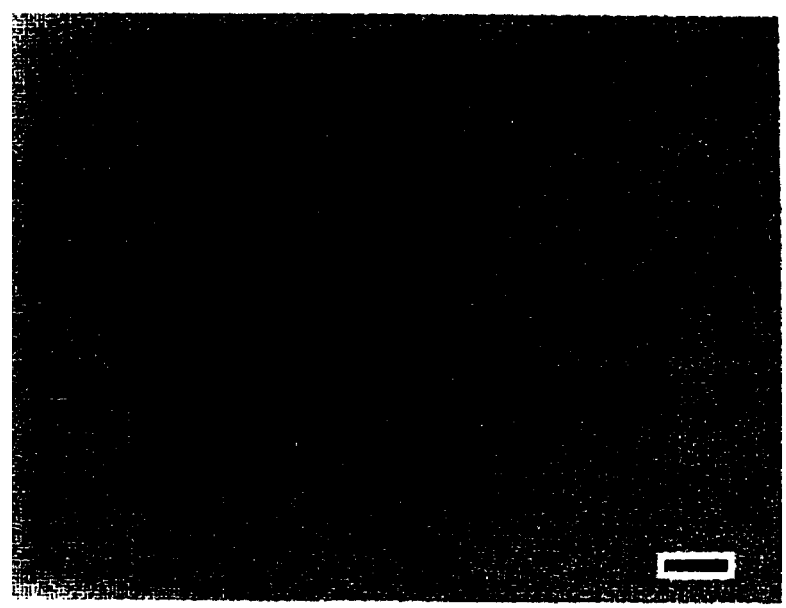
FIG. 4 is a transmission electron microscope (TEM) photograph of the core [L3] of the propylene random copolymer particle obtained in Example 6.
Figure 5:
FIG. 5 is a transmission electron microscope (TEM) photograph of the vicinity of the first skin layer [L1] of the propylene random copolymer particle obtained in Example 6.

The propylene random copolymer particle (Z') according to an embodiment of the invention is one embodiment of the above-described propylene copolymer (Z). The particle is a propylene polymer particle having a trilayer structure consisting of a first skin layer [L1] that is present at the outermost crust, a second skin layer [L2] that is internally contacting with the first skin layer, and a core [L3] that is present inner to the second skin layer. It is also a propylene polymer particle characterized in that, in the transmission electron microscope (TEM) photograph (magnification ×4000) of an ultrathin section of the core [L3] after metal oxide staining, no stained component which has a particle diameter of 3 μm or greater is observed. FIG. 4 and FIG. 5 attached as examples to the present specification, are helpful in easily understanding the layered structure of the propylene random copolymer particle (Z') and homogeneity of the core [L3]. A preferred embodiment of the propylene polymer particle of the invention is a propylene polymer particle (Z'') in which the first skin layer [L1] is made of polyethylene, the second skin layer [L2] is made of a polypropylene having a melting point (Tm) of 130° C. or higher as measured by DSC, and the core [L3] is made of a propylene homopolymer, or a copolymer obtained from propylene and at least one olefin selected from ethylene and an α-olefin having 4 or more carbon atoms.

A more preferred embodiment of the propylene polymer particle of the invention is a propylene polymer particle (Z''') in which the polyethylene of the first skin layer has an intrinsic viscosity [η] of 3 (g/dl) or greater and a density of 910

(kg/M$^3$) or greater, and the polypropylene of the second skin layer has an intrinsic viscosity in the range of 0.5 to 5 (g/dl).

The propylene polymer particles (Z") and (Z''') of the invention are propylene polymer particles having a trilayer structure consisting of a first skin layer [L1], a second skin layer [L2] and a core [L3] as described below.

(i) First skin layer [L1]: The polyethylene constituting the first skin layer [L1] has an intrinsic viscosity [η] of preferably 3 (g/dl) or greater, and more preferably 5 (g/dl) or greater. When [η] is 3 (g/dl) or greater, the entanglement of the polyethylene molecular chains is strong, and destruction of the particle is prevented upon prepolymerization (and actual polymerization). However, in order to have the [η] to be 3 (g/dl) or greater, polyethylene is an optimal material from the viewpoint of the form of the particle. Further, with regard to the density, the skin layer is preferably a high density region, but the layer may be a low density region as in the case of ethylene copolymers. Moreover, in order to have the density to be less than 910 (kg/m$^3$), the amount of the monomer to be copolymerized needs to be increased, and such increase is associated with cost problems. This first skin layer [L1] is formed by the below-described process [P-1].

(ii) Second skin layer [L2]: The polypropylene constituting the second skin layer [L2], which is internally contacting with the first skin layer [L1], has an intrinsic viscosity [η] in the range of 0.5 to 5 (g/dl), and preferably 1 to 3.0 (g/dl). When the intrinsic viscosity [η] is greater than 5 (g/dl), a nearly hydrogen-free state is met during the polymerization in the process [P-2] described below, and the form of the particle becomes poor. Further, when [η] is less than 0.5 (g/dl), the particle undergoes heat evolution to a large extent and is prone to produce fine particles. The melting point (Tm) of the second skin layer [L2] as measured by DSC is 130° C. or higher, and preferably 145° C. or higher. When the melting point is less than 130° C., the polymer has low stereoregularity and is prone to undergo dissolution in the polymerization solvent, and blocking of the polymer particles easily occurs. When it is desired to obtain a polymer having a Tm of less than 130° C. through copolymerization with an α-olefin such as ethylene, the metallocene compound becomes in general easily detached from the catalyst, and consequently, there is an adverse effect on the production process such as an increase in fouling. This second skin layer [L2] is formed by the below-described process [P-2].

(iii) Core [L3]: The component constituting the innermost core layer [L3] is a propylene homopolymer, or a copolymer obtained from propylene and at least one olefin selected from ethylene and an α-olefin having 4 or more carbon atoms. Furthermore, the core [L3] is a layer forming the main part of the propylene random copolymer of the invention, which is formed by the below-described process [P-3].

The invention also encompasses a method for preparing a propylene polymer, comprising sequentially carrying out the following three processes [P-1], [P-2] and [P-3] in the presence of a metallocene catalyst. The preparation method is applicable to propylene polymers including the above-described propylene random copolymer particles (Z") and (Z''') as well as all propylene polymers containing a skeletal constituent derived from propylene as the main constituent. Hereinafter, the preparation method of the invention will be described in detail with reference to the production examples for the above-described propylene random copolymer particles (Z") and (Z''').

Process [P-1] is a process for preparing a polymer precursor [P$_1$] by polymerizing ethylene. The amount of polymerized ethylene per unit weight of catalyst has, in particular, no optimal range in the aspect of the performance of the propylene random copolymer (for example, the properties of the polymer when formed into film). However, from the viewpoint of productivity, the amount of polymerized ethylene per unit weight of catalyst is usually 1 to 50 g/g-cat, preferably 1-20 g/g-cat, and more preferably 1 to 10 g/g-cat. In order to have the amount of polymerization of 50 g/g-cat or more, too long a reaction time is required, which is not desirable from the viewpoint of productivity. (Hereinafter, the polymerization process carried out in process [P-1] may be referred to a "precursory polymerization", and the polymer obtained by this precursory polymerization process [P$_1$] may be referred to as a "polymer precursor".)

Process [P-2] is a process for preparing a prepolymer [P$_2$] by polymerizing propylene in an amount of 50 to 20,000 g/g-cat in the presence of the aforementioned polymer precursor [P$_1$] at a temperature of 5 to 40° C. The process [P-2] usually employs a tubular reactor for preference, but the type of the reactor is not limited, as long as the above-described requirements for the process [P-2] are met. A tubular reactor has a structure comprising a cylindrical flow channel immersed in a temperature-controlled medium, in which reactants are supplied from one end of the tubular reactor and polymerized inside the tubular reactor, and the resulting polymer is removed from the other end of the tubular reactor. Since the tubular reactor requires good heat exchange between the temperature-controlled medium and the reactants, the cylindrical flow channel must be narrow, with the diameter typically being in the range of 1 cm to 15 cm. Moreover, balance in the flow rate should be taken in order to prevent clogging, and sufficient heat exchange is carried out in order to carry out polymerization. Even though such tubular reactor is preferably employed for the preparation of the propylene random copolymer of the invention, any reactor other than the tubular reactor can be also used, as described above, as long as no region of stasis is observed, fouling caused by any region of stasis can be prevented, and polymerization can be carried out under mild conditions such as low temperature.

The amount of the prepolymerized polypropylene is usually 50, to 20,000 g/g-cat, and preferably 100 to 500 g/g-cat. The prevention of the particle destruction during the actual polymerization became possible only when the amount is 50 g/g-cat or higher, but at an amount of polymerization below the value, destruction of particles easily occurs. An amount of polymerization over 20,000 g/g-cat is not desirable from the viewpoint of process facilities. (Hereinafter, the polymerization operation carried out in process [P-2] may be referred to as "prepolymerization", and the polymer obtained by this prepolymerization process [P$_2$] may be referred to as a "prepolymer").

Process [P-3] is a process for preparing a propylene polymer [P3] by (1) homopolymerizing propylene, or (2) copolymerizing propylene with at least one olefin selected from ethylene and an α-olefin having 4 or more carbon atoms, in the presence of the prepolymer [P$_2$]. The amount of polymerization per unit weight of catalyst is preferably 3,000 to 50,000 (g/g-cat). (Hereinafter, the polymerization operation carried out in process [P-3] may be referred to as "actual polymerization", and the polymer obtained by this actual polymerization process [P-3] may be referred to as "actual polymer").

Moreover, the process [P-3] may be rendered to proceed in such a manner that two or more polymerization processes involving different polymerization conditions are carried out in sequence. In an example of such method of polymerization, mention may be made of a method in which homopolymerization of propylene is carried out in one polymerizing unit, and copolymerization of propylene is carried out in another polymerizing unit (Hereinafter, this mode of polymerization may be referred to as "stepwise polymerization").

Hereinafter, the stepwise polymerization for obtaining a random copolymer that is suitably used for film applications will be described in detail. In the stepwise polymerization, the process [P-3] is divided into two processes involving different polymerization conditions, such that process [P-3a], that is, homopolymerization of propylene is carried out in a first reactor, and then process [P-3b], that is, copolymerization of propylene with at least one olefin selected from ethylene and an α-olefin having 4 or more carbon atoms is carried out in a reactor of the next step, which is coupled to the first reactor in series. The propylene random copolymer particle obtained by the stepwise polymerization is a propylene random copolymer particle characterized in that [i] the molecular weight distribution measured by GPC is 4.0 or less; [ii] one or more melting point peaks (Tm) as measured by DSC exist on the high temperature side of 130° C. or higher, and preferably 135° C. or higher, and also on the low temperature side of 125° C. or lower, and preferably 120° C. or lower; [iii] no stained component which has a particle diameter of 3 μm or greater is observed in the transmission electron microscope (TEM) photograph (magnification ×4000) of an ultrathin section after metal oxide staining; and [iv] the n-decane($nC_{10}$)-soluble fraction occupies 5.0% by weight or less. The propylene random copolymer is excellent in transparency, heat sealability at low temperatures and anti-blocking property, and can be used as an excellent heat sealing material with fewer roll marks generated during molding. It should be also noted that no stained component which has a particle diameter of 3 μm or greater is observed in the transmission electron microscopic (TEM) photograph (magnification ×4000) after metal oxide staining of an ultrathin section of the propylene random copolymer particle core [L3] obtained by carrying out stepwise polymerization.

The propylene random copolymer particle according to an embodiment of the invention can be said to be a polypropylene copolymer in which a propylene homopolymer obtained in the presence of a metallocene catalyst (X), and at least one copolymer selected from a copolymer obtained from propylene and ethylene in the presence of a metallocene catalyst (Y), a copolymer obtained from propylene and an α-olefin having 4 or more carbon atoms in the presence of a metallocene catalyst (Z) and a copolymer obtained from propylene, ethylene and an α-olefin having 4 or more carbon atoms in the presence of a metallocene catalyst (W), are uniformly dispersed.

According to the invention, the polymer precursor [$P_1$] prepared in the process [P-1] is preferably washed with a compound (Sol) of aliphatic hydrocarbon having 5 to 12 carbon atoms or of alicyclic hydrocarbon having 5 to 12 carbon atoms. Examples of the aliphatic hydrocarbon having 5 to 12 carbon atoms include n-pentane, 2-methylbutane, n-hexane, 2,3-dimethylbutane, 2-methylpentane, 3-methylpentane, n-heptane, 2,3-dimethylpentane, n-octane, n-nonane, n-decane and n-undecane. Examples of the alicyclic hydrocarbon having 5 to 12 carbon atoms include cyclopentane, cyclohexane, methylcyclohexane, 1,2-dimethylcyclohexane, 1,3-dimethylcyclohexane, isopropylcyclohexane, propylcyclohexane, butylcyclohexane and the like. Among these, n-heptane, n-hexane or a solvent mixture thereof is preferably used from the viewpoint of easy availability, easy washing operation and easy recovery after use. As long as the solvent can remove 95% by weight or more of the detached metallocene compound in the polymer precursor [$P_1$] by washing, the method of washing or conditions for washing are not particularly limited. Typically, washing is carried out by adding the hydrocarbon solvent (Sol) in an amount of 1 (g/L-Sol) relative to the polymer precursor [$P_1$], stirring the mixture at ambient pressure and 30° C. or lower for 15 minutes and then removing the supernatant liquid. Typically, by repeating these operations 1 to 5 times, 95% by weight or more of the detached metallocene compound in the polymer precursor [$P_1$] is removed by washing. In addition, the polymer precursor [$P_1$] may also be prepared by carrying out the process [P-1] in the presence of the hydrocarbon solvent (Sol).

According to an embodiment of the invention, at least one process selected from the process [P-1], process [P-2] and process [P-3] is preferably carried out in the presence of a polyoxyalkylene compound represented by the following formula [I]:

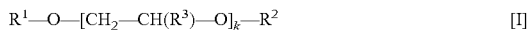

wherein $R^1$, $R^2$ and $R^3$ are selected from a hydrogen atom, an alkyl group having 1 to 20 carbon atoms, an aryl group having 6 to 20 carbon atoms and an acyl group having 1 to 20 carbon atoms; and k represents the average number of the repeating units and is in the range of 1 to 100. Specific examples of the polyoxyalkylene compound include polyoxyethylene lauryl ether, polyoxyethylene oleyl ether, polyoxyalkylene lauryl ether, polyoxyethylene isodecyl ether, polyoxyethylene alkyl ether, polyoxyalkylene alkyl ether, polyoxyethylene castor oil, polyoxyethylene hydrogenated castor oil, polyoxyethylene styrenated phenyl ether, polyoxyethylene oleic acid ester, polyoxyethylene distearic acid ester, polyoxyalkylene glycol, sorbitan sesquioleate, sorbitan monooleate, sorbitan monostearate, sorbitan monolaurate, polyoxyethylene sorbitan monolaurate, polyoxyethylene sorbitan monostearate, polyoxyethylene sorbitan monooleate, polyoxyethylene lanolin alcohol ether, polyoxyethylene lanolin fatty acid ester, polyoxyethylene alkylamine ether, polyethylene glycol alkyl ether, polyethylene glycol monolaurate, polyethylene glycol monostearate, polyethylene glycol monooleate, polyethylene glycol sorbitan monolaurate, polyethylene glycol sorbitan monooleate and the like. Further, these nonionic surfactants can be used alone or in combination of two or more species. Among these compounds, when use is made of a polyoxyalkylene compound in which $R^1$ and $R^2$ are both hydrogen atoms, or at least one of $R^1$ and $R^2$ is an aliphatic acyl group having 12 to 18 carbon atoms, and $R^3$ is a hydrogen atom or a methyl group, generally, the effect of prevention of fouling is high. In addition, use of a compound in which at least one of $R^1$ and $R^2$ is an acyl group is restricted when the ambient condition during polymerization is alkaline.

Among the polyoxyalkylene compounds represented by the formula [I], particularly the polyoxyalkylene glycol represented by the following formula [I'] is preferably used in view of exhibiting an excellent fouling preventive effect:

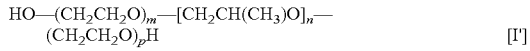

wherein m, n and p each represent the average number of the repeating units, while m is in the range of 1 to 20, n is in the range of 2 to 50, and p is in the range of 1 to 20. In the formula [I'] above, the sum of m and p (m+p), in which m and p indicate the numbers of the oxyethylene repeating unit represented by ($CH_2CH_2O$), is in the range of 2 to 40, preferably 4 to 20, and more preferably 4 to 15. The ratio of the numbers of the repeating unit (m/p) is from 0.1 to 10, and preferably from 0.5 to 5. Meanwhile, n which represents the number of the oxypropylene repeating unit represented by [CH$_2$CH(CH$_3$)O], is in the range of 2 to 50, preferably 10 to 50, and more preferably 20 to 50.

The polyoxyalkylene compound is added into at least one process selected from the above-described processes [P-1], [P-2] and [P-3], but in general, polyoxyalkylene is added into both the process [P-2] and the process [P-3]. The amount of the polyoxyalkylene compound added is 3 to 300% by weight, preferably 5 to 100% by weight, and more preferably 10 to 50% by weight, with respect to the metallocene catalyst (as described below, the "metallocene catalyst" usually consists of a support component such as silica, a co-catalyst component such as methyl aluminoxane, and a metallocene compound). The polyoxyalkylene compound is usually added at one time, intermittently or continuously, in the form of dilution in a hydrocarbon solvent and, in the pressurized form through a flowmeter. Alternatively, the compound can be also fed by pumping without being diluted.

The metallocene catalyst used in the processes [P-1], [P-2] and [P-3] according to the invention is a metallocene catalyst consisting of (A) a metallocene compound, and (B) at least one compound selected from organometallic compounds, organoaluminum oxy compounds and compounds capable of forming ion pairs with metallocene compounds, and optionally a particulate support. Preferably, the metallocene catalyst is a metallocene catalyst capable of catalyzing stereoregular polymerization, resulting in an isotactic structure, a syndiotactic structure or the like. Among the metallocene compounds described above, a bridged metallocene compound represented by the following formula [II], which has been published by the Applicant of the invention in an international patent application (WO01/27124), is suitably used:

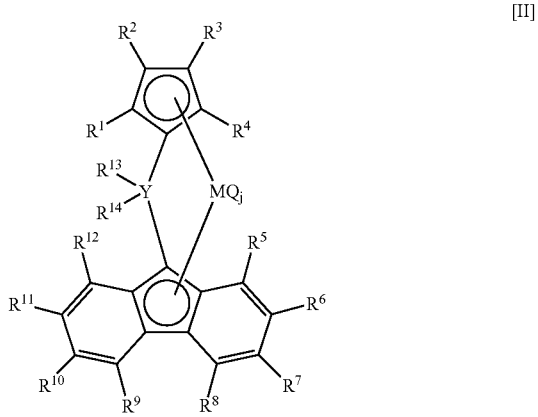

[II]

wherein $R^1$, $R^2$, $R^3$, $R^4$, $R^5$, $R^6$, $R^7$, $R^8$, $R^9$, $R^{10}$, $R^{11}$, $R^{12}$, $R^{13}$ and $R^{14}$ may be identical with or different from each other and are selected from hydrogen, a hydrocarbon group and a silicon-containing group. Examples of the hydrocarbon group include straight-chained hydrocarbon groups such as a methyl group, an ethyl group, an n-propyl group, an allyl group, an n-butyl group, an n-pentyl group, an n-hexyl group, an n-heptyl group, an n-octyl group, an n-nonyl group and an n-decanyl group; branched hydrocarbon groups such as an isopropyl group, a tert-butyl group, an amyl group, a 3-methylpentyl group, a 1,1-diethylpropyl group, a 1,1-dimethylbutyl group, a 1-methyl-1-propylbutyl group, a 1,1-propylbutyl group, a 1,1-dimethyl-2-methylpropyl group and a 1-methyl-1-isopropyl-2-methylpropyl group; cyclic saturated hydrocarbon groups such as a cyclopentyl group, a cyclohexyl group, a cycloheptyl group, a cyclooctyl group, a norbornyl group and an adamantyl group; cyclic unsaturated hydrocarbon groups such as a phenyl group, a tolyl group, a naphthyl group, a biphenyl group, a phenanthryl group and an anthracenyl group; saturated hydrocarbon groups substituted with a cyclic unsaturated hydrocarbon group such as a benzyl group, a cumyl group, a 1,1-diphenylethyl group and a triphenylmethyl group; heteroatom-containing hydrocarbon groups such as a methoxy group, an ethoxy group, a phenoxy group, a furyl group, an N-methylamino group, an N,N-dimethylamino group, an N-phenylamino group, a pyrryl group and a thienyl group; and the like. Examples of the silicon-containing group include a trimethylsilyl group, a triethylsilyl group, a dimethylphenylsilyl group, a diphenylmethylsilyl group, a triphenylsilyl group and the like. The adjacent substituents $R^5$ to $R^{12}$ may be bonded together to form a ring. Examples of such substituted fluorenyl group include a benzofluorenyl group, a dibenzofluorenyl group, an octahydrodibenzofluorenyl group, an octamethyloctahydrodibenzofluorenyl group, an octamethyltetrahydrodicyclopentafluorenyl group and the like.

In the above formula [II], $R^1$, $R^2$, $R^3$ and $R^4$, which are the substituents of the cyclopentadienyl ring, are preferably hydrogen or hydrocarbon groups having 1 to 20 carbon atoms, and more preferably, R1 and R3 are hydrogen, while $R^2$ and $R^4$ are hydrocarbon groups having 1 to 20 carbon atoms. The hydrocarbon group having 1 to 20 carbon atoms may be exemplified by the hydrocarbon groups described in the above. Among these, $R^2$ is more preferably a bulky substituent such as a tert-butyl group, an adamantyl group or a triphenylmethyl group, while $R^4$ is more preferably a substituent sterically smaller than $R^2$, such as a methyl group, an ethyl group or an n-propyl group. The term "sterically small" as used herein implies that the volume which the substituent occupies is small.

In the above formula [II], $R^5$ through $R^{12}$ which are the substituents of the fluorenyl ring are preferably hydrogen or hydrocarbon groups having 1 to 20 carbon atoms. The hydrocarbon group having 1 to 20 carbon atoms may be exemplified by the hydrocarbon groups described in the above. The adjacent substituents $R^5$ to $R^{12}$ may be bonded together to form a ring.

In the above formula [II], Y bridging the cyclopentadienyl ring and the fluorenyl ring is a carbon atom or a silicon atom, and preferably a carbon atom. $R^{13}$ and $R^{14}$, which are the substituents of Y, are preferably hydrocarbon groups having 1 to 20 carbon atoms. These substituents may be identical with or different from each other, and may be bonded to each other to form a ring. The hydrocarbon group having 1 to 20 carbon atoms may be exemplified by the hydrocarbon groups described in the above. Even more preferably, $R^{14}$ is an alkyl group having 1 to 5 carbon atoms or an aryl group having 6 to 20 carbon atoms. Further, $R^{13}$ and $R^{14}$ may be identical with or different from each other, and may be bonded to each other to form a ring. Examples of such substituent include a fluorenylidene group, a 10-hydroanthracenylidene group, a dibenzocycloheptadienylidene group and the like.

In the above formula [II], M is a transition metal belonging to Group 4, and preferably Ti, Zr, Hf or the like. Q is selected from halogen, a hydrocarbon group, an anionic ligand and a neutral ligand capable of coordination with a lone electron pair, combined in identical or different combinations. j is an integer of 1 to 4, and when j is 2 or greater, Q may be identical with or different from each other. Specific examples of the halogen include fluorine, chlorine, bromine and iodine, and specific examples of the hydrocarbon group include the hydrocarbon groups described above. Specific examples of the anionic ligand include alkoxy groups such as methoxy, tert-butoxy, phenoxy and the like; carboxylate groups such as acetate, benzoate and the like; sulfonate groups such as mesylate, tosylate and the like; and the like. Specific examples of the neutral ligand capable of coordination with a lone electron pair include organic phosphorous compounds such as trimethylphosphine, triethylphosphine, triphenylphosphine, diphenylmethylphosphine and the like; ethers such as tetrahydrofuran, diethyl ether, dioxane, 1,2-dimethoxyethane and the like; and the like. Q is preferably such that at least one is a halogen atom or an alkyl group.

Examples of such bridged metallocene compound that can be preferably used include isopropylidene(3-tert-butyl-5-methylcyclopentadienyl) (fluorenyl) zirconium dichloride, isopropylidene(3-tert-butyl-5-methylcyclopentadienyl)(3,6-di-tert-butylfluorenyl) zirconium dichloride, diphenylmethylene(3-tert-butyl-5-methylcyclopentadienyl) (fluorenyl) zirconium dichloride, diphenylmethylene(3-tert-butyl-5-methylcyclopentadienyl) (2,7-di-tert-butylfluorenyl) zirconium dichloride, diphenylmethylene(3-tert-butyl-5-methylcyclopentadienyl) (3,6-di-tert-butylfluorenyl) zirconium dichloride, isopropylidene (3-tert-butyl-5-methylcylopentadienyl) (octamethyloctahydrodibenzofluorenyl) zirconium dichloride, isopropylidene (3-tert-butyl-5-ethylcyclopentadienyl) (octamethyloctahydrodibenzofluorenyl) zirconium dichloride, diphenylmethylene(3-tert-butyl-5-ethylcyclopentadienyl) (fluorenyl) zirconium dichloride, phenylmethylmethylene(3-tert-butyl-5-ethylcyclopentadienyl) (octamethyloctahydrodibenzofluorenyl) zirconium dichloride, and phenylmethylmethylene(3-tert-butyl-5-methylcyclopentadienyl) (octamethyloctahydrodibenzofluorenyl) zirconium dichloride.

The metallocene catalyst according to an embodiment of the invention consists of:

(A) a metallocene compound represented by the above formula [II], (B) at least one compound selected from organometallic compounds (B-1), organoaluminum oxy compounds (B-2) and compounds capable of forming ion pairs by reacting with a metallocene compound (B-3), and optionally (C) a particulate support.

Hereinafter, the respective components will be described in detail.

(B-1) Organometallic Compounds

Specific examples of the organometallic compound (B-1) used in the invention include the following organometallic compounds of Groups 1, 2, 12 and 13.

(B-1a) Organoaluminum compounds represented by the formula: $R^a{}_m Al(OR^b)_n H_p X_q$, wherein $R^a$ and $R^b$ may be identical with or different from each other and are respectively a hydrocarbon group having 1 to 15 carbon atoms, and preferably 1 to 4 carbon atoms; X is a halogen atom; and m, n, p and q are numbers satisfying the conditions: $0<m\leq 3$, $0\leq n<3$, $0\leq p<3$, and $0\leq q<3$, while $m+n+p+q=3$. Specific examples of the compound include trimethylaluminum, triethylaluminum, triisobutylaluminum, diisobutylaluminum hydride and the like.

(B-1b) Alkylated complexes of a metal belonging to Group 1 and aluminum as represented by the formula: $M^2AlR^a{}_4$, wherein $M^2$ is Li, Na or K; and $R^a$ is a hydrocarbon group having 1 to 15 carbon atoms, and preferably 1 to 4 carbon atoms. Examples of such compound include $LiAl(C_2H_5)_4$, $LiAl(C_7H_{15})_4$ and the like.

(B-1c) Dialkyl compounds of a metal belonging to Group 2 or Group 12 as represented by the formula: $R^a R^b M^3$, wherein $R^a$ and $R^b$ may be identical with or different from each other and are respectively a hydrocarbon group having 1 to 15 carbon atoms, and preferably 1 to 4 carbon atoms; and $M^3$ is Mg, Zn or Cd.

Among the aforementioned organometallic compounds (B-1), organoaluminum compounds are preferred. Further, these organometallic compounds (B-1) may be used alone or in combination of two or more species.

(B-2) Organoaluminum Oxy Compounds

The organoaluminum oxy compounds (B-2) used in the invention may be conventionally known aluminoxanes, or may be benzene-insoluble organoaluminum oxy compounds exemplified in JP-A No. 2-78687.

The conventionally known aluminoxanes are prepared by a method in which an organoaluminum compound such as trialkylaluminum is added to a hydrocarbon medium suspension of a compound containing adsorbed water or a salt containing crystallized water, so as to induce reaction of the adsorbed water or crystallized water with the organoaluminum compound, or by a method in which an organoaluminum compound such as trialkylaluminum is directly subjected to the action of water, ice or water vapor in the presence of a medium such as benzene, toluene, diethyl ether or tetrahydrofuran.

The organoaluminum compound used for the preparation of aluminoxanes may be specifically exemplified by the same organoaluminum compounds listed as the organoaluminum compounds for the above-described compounds (B-1a). Among these, trialkylaluminum and tricycloalkylaluminum are preferred, and trimethylaluminum is particularly preferred. The above-described organoaluminum compounds are used alone or in combination of two or more species. Further, the aluminoxane prepared from trimethylaluminum is referred to as methylaluminoxane or MAO, which is a compound that is particularly preferably used.

These organoaluminum oxy compounds (B-2) are used alone or in combination of two or more species.

(B-3) Compounds Capable of Forming Ion Pairs By Reacting With a Metallocene Compound Examples of the compound capable of forming ion pairs by reacting with a metallocene compound (B-3) (hereinafter, referred to as "ionized ionic compound") that is used in the invention, include the Lewis acids, the ionic compounds, the borane compounds and the carborane compounds described in JP-A 1-501950, JP-A No. 1-502036, JP-A No. 3-179005, JP-A No. 3-179006, JP-A No. 3-207703, JP-A No. 3-207704, U.S. Pat. No. 5,321,106 and the like. Further, heteropoly compounds and isopoly compounds are also included in the examples. These ionized ionic compounds (B-3) are used alone or in combination of two or more species.

(C) Particulate Support

The particulate support (C) optionally used in the invention is an inorganic or organic compound, and is a solid in the granular or microparticulate form. Among these, porous oxides, inorganic chlorides, clays, clay minerals or ion-exchangeable layer compounds are preferred, and porous oxides are particularly preferred.

Specific examples of the porous oxide include $SiO_2$, $Al_2O_3$, MgO, $ZrO_2$, $TiO_2$, $B_2O_3$, CaO, ZnO, BaO, $ThO_2$ and the like, or composites or mixtures containing these compounds. Among these, those containing $SiO_2$ and/or $Al_2O_3$ as the main components are preferred. These porous oxides vary in nature depending on the kind and method of preparation, but a support that can be preferably used in the invention preferably has a particle size of 5 to 300 μm, and more preferably 10 to 100 μm, a specific surface area in the range of 50 to 1000 $m^2/g$, and more preferably 200 to 900 $m^2/g$, and a pore volume in the range of 0.3 to 3.0 $cm^3/g$. Such support is used after calcination, if necessary, at a high temperature of 100 to 1000° C., preferably 150 to 700° C.

In addition, for the components (A), (B) and (C), the compounds described in WO01/27124, which has been publicized by the Applicant of the invention, can be used without being limited, in addition to the compounds described in the above.

The propylene random copolymer can be obtained as a particle by carrying out post-treatment processes such as the well-known catalyst deactivation process, catalyst residue removal process and drying process, after carrying out the aforementioned processes [P-1], [P-2] and [P-3], if desired. Various additives as desired, such as an antioxidant, a UV absorbent, an antistatic agent, a nucleating agent, a lubricant, a flame-retardant, an anti-blocking agent, a colorant, an inorganic or organic filler and various synthetic resins are added to the resulting propylene random copolymer particle, and the mixture is melt kneaded and pelletized into a pellet, which can be provided for the production of various molded articles.

In order to mix the propylene random copolymer particle of the invention with predetermined amounts of the aforementioned various additives, a conventional kneading device such as Henschel mixer, ribbon blender or Banbury mixer can be employed. For the melt kneading and pelletization processes, the propylene random copolymer is melt kneaded at 170 to 300° C., and preferably 190 to 250° C., using a conventional single-screw extruder or a twin-screw extruder, a Brabender or a roll, and is pelletized. The resulting propylene random copolymer composition can be processed into the desired molded articles, such as films, sheets, OPP sealants, blow molded products, injection-stretch blow molded products and injection molded products, by various molding techniques such as injection molding, extrusion molding, injection-stretch blow molding and blow molding.

In particular, the propylene random copolymer of the invention can be suitably used for the sealant application, since the copolymer has a low melting point and good antiblocking property. Further, the propylene random copolymer of the invention is capable of biaxial stretching at low temperatures and has a high heat shrinkage rate. Thus, the copolymer can be suitably used for the shrink film applications. The propylene random copolymer can be also used for the production of injection molded articles having both of high transparency and high impact resistance, since the copolymer has a low melting point and can have high molecular weights. Hereinafter, the sealant films, shrink films (and shrink labels) and metal-deposited films, which are molded products obtained from the propylene random copolymer of the invention, will be described in detail.

Sealant Films and Laminates Thereof

Since propylene resins in general have relatively high melting points, for the sealant applications, usually propylene/α-olefin copolymers that are prepared by copolymerizing propylene with ethylene or an α-olefin having 4 to 10 carbon atoms, have been used to improve the polymer's heat sealability at low temperatures. However, even though the packaging films comprising conventionally known propylene/α-olefin copolymers have excellent transparency compared with the films made of high- and low-density polyethylene, the propylene/α-olefin copolymer films have a problem that heat sealability at low temperatures is unsatisfactory.

The sealant films employing the propylene random copolymer of the invention as the raw material provide excellent sealant films solving the above-described problems. Here, two preferred forms of sealant films obtained from the propylene random copolymer of the invention, and laminates comprising the same will be described in detail.

The sealant film of the first type is a sealant film having a thickness of 1 to 100 μm, which comprises a propylene random copolymer according to an embodiment of the invention having at least one melting peak (i.e., melting point Tm) measured by DSC on the high temperature side of 130° C. or higher and on the low temperature side of 125° C. or lower, respectively, and having a half crystallization time of 6 minutes or less. Such propylene random copolymer exhibiting plural melting points may be prepared by carrying out stepwise polymerization in the process [P-3] as described above, or by blending the propylene random copolymers showing different melting points. A preferred form of the blend in the case of blending two different propylene random copolymers exhibiting different melting points, is prepared by melt kneading a polypropylene composition which comprises 5 to 80 parts by weight of (A) a propylene random copolymer having a melting point (Tm) of 130° C. or higher as determined by DSC, and 20 to 95 parts by weight of (B) a propylene random copolymer having a melting point (Tm) of 125° C. or lower as determined by DSC, using a twin-screw extruder or the like.

Film formation using the above-described propylene random copolymer exhibiting plural melting points can lead to rapid preparation of packaging films which require impact resistance, high heat seal strength (specifically, 2.0 N/15 mm or greater), and low temperature heat sealability. Film formation may be carried out by a cast molding method or an inflation molding method, and good films of uniform thickness can be prepared usually at a resin temperature of 180 to 240° C. The film thickness is preferably in the range of 1 to 100 μm, and more preferably in the range of 3 to 80 μm. The films thus obtained have good low temperature impact resistance, high heat seal strength and low temperature heat sealability and thus, are used for the laminates described below, and in particular, is preferably used as the sealant films for the high-retort and semi-retort packaging.

The sealant film of the second type is a sealant film comprising a propylene random copolymer according to an embodiment of the invention, and it satisfies that the melting point (Tm) as determined by DSC is in the specific range of 120° C. or lower. Film formation using such propylene random copolymer can lead to rapid preparation of a sealant film for the packaging cases where impact resistance, high heat seal strength and low temperature heat sealability are required. Film formation may be carried out by a cast molding method or an inflation molding method, and good films of uniform thickness can be prepared usually under the condition of a resin temperature of 180 to 240° C. The film thickness is preferably in the range of 1 to 100 μm, and more preferably in the range of 3 to 80 μm.

The second type sealant film is characterized in that the Δ haze (80° C., the change rate of haze after 7 days) is 2% or less, preferably 1.5% or less, and the heat seal strength is 5 N/15 mm or more, and preferably 6.5 N/15 mm or more. When the Δ haze exceeds 2%, the sealant film has a poor external appearance and is deteriorated in the anti-blocking property, thereby being limited in the use for the applications of food packaging or industrial films, this being not-desirable. When the heat seal strength is less than 5 N/15 mm, the sealed part of the packaging does not exhibit sufficient sealability to withstand high-speed packaging, this being not desirable. As such, the second type sealant film has good low temperature impact resistance, high heat seal strength and low temperature heat sealability, and is also characterized in exhibiting small changes in the haze over time.

The first type sealant film and the second type sealant film described above can be used per se as single films, but it is also possible to use the films as constituents of a laminate in which the films are laminated on a substrate, generally in the applications of packaging films or packaging sheets. The substrate is not particularly limited, but films of polyolefin such as polyethylene or polypropylene; styrene resin films; films of polyester such as polyethylene terephthalate or polybutylene terephthalate; films of polyamide such as Nylon 6 or Nylon 6,6; oriented films thereof; laminate films including a polyolefin film, and a polyamide film or a resin film having the gas barrier property such as an ethylene-vinyl alcohol copolymer film; metal foils such as an aluminum foil; deposited films having aluminum or silica deposited; paper or the like can be appropriately selected and used in accordance with the purpose of the intended use of the packaging material. These substrates can be used alone or in combination of two or more species.

The layer of the above-described film is preferably disposed at the outermost layer of at least one side of a laminate to form a sealant layer. In the preparation of the laminate, a method of directly extrusion laminating the above-described resin composition of the invention on a substrate, a method of dry laminating a substrate and a sealant film, or a method of co-extruding the resins constituting the two respective layers, can be employed.

One embodiment of the laminate is a constitution including a sealant film layer (X)/polyolefin film layer (Y1)/other film layer (Y2). Here, one of the example of the other film layer is the layer selected from the group consisting of the aforementioned polystyrene films, polyester films, polyamide films, laminate films including a polyolefin film and a gas barrier resin film, an aluminum foil, a deposited film and paper.

When the polyolefin layer and the other film layer cannot be bonded with sufficient adhesive strength, the laminate can have a constitution including a sealant film layer/polyolefin film layer/adhesive layer/the other film layer. For the adhesive layer, an anchor coating agent such as a urethane adhesive or an isocyanate adhesive, or a modified polyolefin such as unsaturated carboxylic acid graft polyolefin can be used as the adhesive resin to strongly bond the adjacent layers.

A container can be produced by arranging the film layers of the aforementioned laminate to face each other or arranging the film layers of the laminate and another film to face each other, and then heat sealing at least a part of the periphery of the outer surface so as to form a desired container shape. A sealed pocket-shaped container also can be produced by heat sealing the entire periphery. A packaged product can be produced by combining the molding process for this pocket-shaped container with the process of filling the container with the contents, in other words, by heat sealing the bottom and the lateral sides of the pocket-shaped container, subsequently filling in the contents, and then heat sealing the top of the container. Therefore, this laminate film can be used for automatic packaging facilities for solids such as cookies and bread, powders or liquid materials.

Shrink Films and Shrink Labels

In general, the shrink films obtained by molding conventional propylene polymers have a tendency that an attempt to increase the heat shrinkage rate leads to an increase in the natural shrinkage rate [a phenomenon of shrinkage occurring over time at room temperature (25 to 40° C.)]. Because of this, development of a shrink film exhibiting a higher heat shrinkage rate and a lower natural shrinkage rate is demanded in the related industries.

The shrink film or shrink label comprising the propylene random copolymer of the invention as the raw material can be stretched at 80° C. or lower, and the film thus obtained exhibits a shrinkage rate at 80° C. of 25% or greater, a shrinkage rate at 90° C. of 35% or greater, and a shrinkage rate at 40° C. of 3.0% or less, thus being a practical film for the shrink labels.

The above-described shrink film or shrink label is prepared by providing a resin composition comprising the propylene random copolymer according to an embodiment of the invention, which is a propylene random copolymer characterized in that the molecular weight distribution (Mw/Mn) is 4.0 or less, and moreover, the molecular weight distribution (Mw/Mn) of the n-decane-soluble fraction is also 4.0 or less, and optionally comprising a petroleum resin blended with the propylene random copolymer; optionally adding additives such as an antioxidant, a heat-resistant stabilizer, a weather-resistant stabilizer, a slipping agent, an anti-blocking agent and a crystal nucleating agent, to the above resin composition; and subjecting the resin composition to a publicly known co-extrusion technique or drawing technique. For example, the propylene random polymer or the resin composition is extruded into a flat sheet through a T-die, cooled, taken up, subjected to roll drawing to 1.0 to 2.0 fold-lengths in the longitudinal direction and subjected to tent drawing to 3 to 10 fold-lengths in the transverse direction, annealed while being subjected to relaxation to 0 to 12% in the width direction, and then taken up with winding to obtain a shrink film. The process of drawing may be carried out, in addition to uniaxial or biaxial drawing by means of a tenter as described above, by extruding a tubular sheet through a circular die to draw in a tube shape, in other words, by a tubular simultaneous biaxial drawing method. The shrink film or shrink label thus molded can be said to be a shrink film or shrink label showing practical shrinkage balance in which the shrinkage rate at 80° C. is 25% or greater, the shrinkage rate at 90° C. is 35% or greater, and the shrinkage rate at 40° C. is 3.0% or less.

In addition, for the petroleum resin that is used as needed, hydrocarbon resins including aliphatic hydrocarbons, alicyclic hydrocarbons, hydrogenated hydrocarbons and the like, or terpene resins can be arbitrarily used. With regard to the amount of use of the petroleum resin, a resin composition containing usually 0 to 45 parts by weight of the petroleum resin relative to 100 to 55 parts by weight of the propylene random copolymer, and preferably 10 to 40 parts by weight of the petroleum resin relative to 90 to 60 parts by weight of the propylene random copolymer, can be suitably used for oriented films such as shrink films and shrink labels.

Metal-deposited Films

In order to inhibit permeation of water vapor and to impart gas barrier property against gases such as oxygen and nitrogen, light blocking property, conductivity and the like, it is known to deposit metal or metal oxide on plastic films. Examples of the plastic film which serves as the base of deposited films include films of polyethylene terephthalate, polyamides, polycarbonates, polyethylene, polypropylene and the like. With regard to polypropylene among these, the polypropylene prepared by using a conventional Ziegler-Natta catalyst shows an increase in the amount of the component in low molecular weight regions when the amount of co-monomer such as ethylene or 1-butene is increased to lower the melting point, and thus there are problems that the adherence between the polypropylene film and the metal film to be deposited is generally poor, and the low temperature sealability and anti-blocking property of the film are deteriorated. If a metal-deposited polypropylene film addressing these problems could be obtained, the film would have significant commercial and industrial values as the packaging material for foodstuff, pharmaceuticals, industrial materials, goods for daily use, chemical agents and the like. That is, metal-deposited polypropylene films having excellent low temperature sealability and anti-blocking property as well as excellent adherence between the film and the metal film to be deposited, and packaging materials formed from the films are desired.

The polypropylene found by the invention to be useful for films deposited with metal such as aluminum and to show excellent performance is, among the propylene random copolymers of the invention, a copolymer which satisfies the requirement that the xylene-soluble fraction (hereinafter, may be abbreviated to "CXS") is 2.0% by weight or less. Furthermore, the film obtained from this copolymer satisfies the following relational expression (Eq-5), preferably the following relational expression (Eq-5'), and more preferably the following relational expression (Eq-5"), as well as the following relational expression (Eq-6):

$$[\sigma(0)-\sigma(7)]/\sigma(0) \leq 0.18 \quad \text{(Eq-5)}$$

$$[\sigma(0)-\sigma(7)]/\sigma(0) \leq 0.15 \quad \text{(Eq-5')}$$

$$[\sigma(0)-\sigma(7)]/\sigma(0) \leq 0.13 \quad \text{(Eq-5")}$$

wherein $\sigma(0)$ is the surface tension (mN/m) of the film immediately after molding, and $\sigma(7)$ is the surface tension (mN/m) of the film after 7 days from the time of molding. ; and $$E \geq \alpha \times Tm - 500 \quad \text{(Eq-6)}$$

wherein E is an average value of the Young's modulus (MPa) in the MD direction and TD direction, Tm is the melting point (° C.) as measured with a differential scanning calorimeter, and $\alpha$ is a proportional constant depending on the measurement temperature, specifically such that $\alpha=10$ at 23° C., $\alpha=5$ at 60° C. and $\alpha=4$ at 100° C.

The above-mentioned metal deposited film obtained from the propylene random copolymer according to an embodiment of the invention is a very practical metal-deposited film having the features that: [1] the film can maintain close adherence with the deposited metal for a long time and stripping of the deposit hardly occurs during use; [2] when a wound roll of trilayer film before metal deposition which consists of, for example, a homopolypropylene (h1)/homopolypropylene (h2)/propylene random copolymer (r) is put under long-term storage, the amount of contamination from the surface of the propylene random copolymer (r) to the homopolypropylene layer (1); and [3] even under an atmosphere of high temperatures, the toughness corresponding to the melting point is high, that is, the winding folds hardly occur during deposition.

Hereinafter, the invention will be explained in more detail with reference to Examples, but the invention is not limited to these Examples. Measurement of the various properties provided in the Examples was made by the following analysis methods [m1] to [m21], and the following molding/processing methods [a1] to [a2], if not specified otherwise.

[m1] Px (% by Mole) in the Propylene Random Copolymer

In order to measure the concentration, Px (% by mole), of the skeletal constituent derived from at least one olefin selected from ethylene and α-olefins having 4 to 20 carbon atoms in the propylene random copolymer, 20 to 30 mg of a sample was dissolved in 0.6 ml of a 1,2,4-trichlorobenzene/deuterated benzene (2:1) solution and was subjected to the carbon nuclear magnetic resonance analysis ($^{13}$C-NMR). The quantitative determination of propylene, ethylene and the α-olefin was made on the basis of the dyad chain distribution. For example, in the case of a propylene-ethylene copolymer, the quantities were determined from the following formulas (Eq-7) and (Eq-8), using the definitions PP=$S_{\alpha\alpha}$, EP=$S_{\alpha\gamma}$+$S_{\alpha\beta}$, and EE=½($S_{\beta\delta}$+$S_{\delta\delta}$)+¼$S_{\gamma\delta}$:

$$\text{Propylene (mol \%)} = (PP + \tfrac{1}{2}EP) \times 100 / [(PP + \tfrac{1}{2}EP) + (\tfrac{1}{2}EP + EE)] \quad \text{(Eq-7)}$$

$$\text{Ethylene (mol \%)} = (\tfrac{1}{2}EP + EE) \cdot 100 / [(PP + \tfrac{1}{2}EP) + (\tfrac{1}{2}EP + EE)] \quad \text{(Eq-8)}$$

In addition, the attribution of the α-olefin was referred to the information published in [Macromolecules, 15, 1150 (1982); Macromolecules 24, 4813 (1991); and J. Appl. Polym. Sci., 42, 399 (1991)].

[m2] Melting Point (Tm)

The measurement was carried out using a differential scanning calorimeter (DSC, manufactured by PerkinElmer, Inc.). Here, the endothermal peak obtained in the third step was defined as the melting point (Tm).

(Conditions for Measurement)

First step: Temperature elevated to 240° C. at a rate of 10° C./min and maintained for 10 min.

Second step: Temperature lowered to 60° C. at a rate of 10° C./min.

Third step: Temperature elevated to 240° C. at a rate of 10° C./min.

[m3] Measurement of 2,1-bonding and 1,3-bonding

The 2,1-bondings and 1,3-bondings were measured using $^{13}$C-NMR according to the method described in JP-A No. 7-145212.

[m4] Molecular Weight Distribution (Mw/Mn) [Weight Average Molecular Weight (Mw), Number Average Molecular Weight (Mn)]

Measurement was made as follows, using a GPC150C Plus manufactured by Waters Corporation. The separating columns were a TSKgel GMH6-HT and a TSKgel GMH6-HTL, and the size of each column was an inner diameter of 7.5 mm and a length of 600 mm. The column temperature was 140° C., and the mobile phase was o-dichlorobenzene (manufactured by Wako Pure Chemical Industries, Ltd.) containing 0.025% by weight of BHT (manufactured by Wako Pure Chemical Industries, Ltd.) as an antioxidant, flowing at a rate of 1.0 ml/min. The sample concentration was 0.1% by weight, and the amount of sample injection was 500 µl. The detector used was a differential refractometer. The standard polystyrenes used were a product by Tosoh Corp. for the molecular weight of Mw<1000 and Mw>4×10$^6$, and a product by Pressure Chemical Co. for the molecular weight of 1000≦Mw≦4×10$^6$.

[m5] Amount of n-decane-soluble Fraction (Amount of nC$_{10}$-soluble Fraction)

To 5 g of a propylene random copolymer sample, 200 ml of n-decane was added, and the mixture was heated to 145° C. for 30 minutes to dissolve the sample. The solution was cooled to 20° C. over about 3 hours and maintained for 30 minutes. Thereafter, a precipitate (n-decane-insoluble fraction) was separated by filtration. The filtrate was mixed with about 3 fold-volumes of acetone to precipitate out the components dissolved in n-decane. The precipitate was separated by filtration from acetone and then dried. When the filtrate fraction was concentrated and dried, no residue was recognized. The amount of the n-decane-soluble fraction was determined by the following formula:

Amount of n-decane-soluble fraction (wt %)=[weight of precipitate/weight of sample]×100

[m6] Amount of Xylene-soluble Fraction 5 g of the weighed sample was completely dissolved in 500 ml of boiling xylene, and the solution was left to stand until the temperature of the liquid dropped to 20° C. After the liquid temperature reached 20° C., the solution was left to stand for another 30 minutes, and a precipitate formed was filtered off. The liquid was concentrated and dried, and then further dried at 60° C. and 160 mmHg for 6 hours. The obtained residue was weighed. The amount of the xylene-soluble fraction (CXS) was calculated from the ratio of the weight of the used sample and the weight of the xylene-eluted product.

[m7] Measurement By Cross Fractionation Chromatography (Measurement by CFC)

CFC was carried out using the following apparatus including the temperature rising elution fractionation (TREF) part for compositional fractionation and the GPC part for molecular weight fractionation, and measurement was made under the following conditions to calculate the amount of the components eluted at 40° C. or lower.

Apparatus for measurement: Type CFC T-150A (manufactured by Mitsubishi Chemical Corp., trademark)

Column: Shodex AT-806 MS (3 columns)

Dissolving liquid: o-dichlorobenzene

Flow rate: 1.0 ml/min

Sample concentration: 0.3 wt/vol % (containing 0.1% BHT)

Amount of injection: 0.5 ml

Solubility: Complete dissolution

Detector: Infrared absorption detection, 3.42μ (2924 cm$^{-1}$), NaCl plate

Elution temperature: 0 to 135° C., 28 fractions [0, 10, 20, 30, 40, 45, 50, 55, 60, 65, 70, 75, 80, 85, 90, 94, 97, 100, 103, 106, 109, 112, 115, 118, 121, 124, 127, 135° C.]

[m8] Melt Flow Rate (MFR)

The melt flow rate was measured according to the method of ASTM D-1238 at 230° C. under a load of 2.16 kg.

[m9] Intrinsic Viscosity [η]

The intrinsic viscosity [η] was measured at 135° C. using a decalin solvent. About 20 mg of a sample was dissolved in 15 ml of decalin, and the specific viscosity, ηsp/was measured in an oil bath at 135° C. This decalin solution was diluted by adding 5 ml of the decalin solvent, and the specific viscosity, η$_{sp}$, was measured in the same manner. This dilution operation was further repeated twice to determine the value of η$_{sp}$/C of when the concentration (C) is extrapolated to 0, as the intrinsic viscosity.

[η]=$lim(\eta_{sp}/C)(C \to 0)$

[m10] Density ρ

The density was measured with a density gradient column according to ASTM D-1505.

[m11] Transmission Electron Microscope (TEM) Photographs

Apparatus for observation: H-7100FA (manufactured by Hitachi, Ltd.)

Accelerating voltage: 100 kV

Specimen preparation apparatus: Ultramicrotome (manufactured by Leica Microsystems Japan)

Knife: Diatome Ultra Dry (manufactured by Diatome Ltd.)

An ultrathin section was prepared by embedding a sample in a resin, trimming, surfacing the specimen with an ultramicrotome equipped with a diamond knife, and staining the specimen with a metal oxide. Then, the prepared section was observed with TEM, and microscopic photographs were taken at a magnification of 4000 times.

[m12] Nature of Powder (Particle)

The powder obtained during the polymerization process was sampled and examined with naked eyes.

[m13] Fouling in Polymerization Vessel

After completion of polymerization, the polymerization vessel was opened and examined with naked eyes.

[m14] Half Crystallization Time ($T_{1/2}$)

DSC measuring device: DSC-7 (manufactured by PerkinElmer, Inc.)

Sampling: A pellet was hot pressed at 230° C. to a thin sheet, cut into a predetermined size, and placed in a predetermined container.

Measuring conditions: Temperature is elevated to 230° C. at a rate of 40° C./min, and the sample is preheated for 10 minutes under an atmosphere of 230° C. Thereafter, the temperature is lowered to 105° C. at a rate of 320° C./min and maintained under an atmosphere of 105° C. The time taken to reach one half of the total heat of crystallization obtained thereupon is defined as the half crystallization time ($T_{1/2}$).

[m15] Haze of Film

The haze was measured according to ASTM D-1003.

[m16] Flexural Modulus of Film

The flexural modulus was measured according to ASTM D-790.

[m17] Heat Seal Strength of Film

A film was sampled by cutting to a width of 5 mm, and the sample was sealed under a pressure of 0.2 MPa for a sealing time of 1 second. Both ends of the sealed film were pulled at a rate of 300 mm/min to measure the maximum peeling strength. Further, the upper part of the seal bar was set to a fixed temperature of 115 to 130° C., and the lower part was set to 70° C. In order to investigate the effect of the sealing temperature on the seal strength, in the case of altering the sealing temperature, only the temperature of the upper part of the seal bar was changed.

[m18] Heat Shrinkage Rate of Film

An oriented film was cut to a size of 1 cm in width and 15 cm in length, and was shrunk by subjecting the film to warm water at a predetermined temperature for 10 seconds. The shrinkage rate was determined from the original length and the shrunk length.

[m19] Natural Shrinkage Rate of Film

An oriented film was cut to a size of 1 cm in width and 15 cm in length, and was shrunk by storing the film in an oven at 40° C. for 7 days. The shrinkage rate was determined from the original length and the shrunk length.

[m20] Young's Modulus of Film

The Young's modulus of a stretched film was measured according to JIS K6781.

The tensile rate was 200 mm/min, and the distance between chucks was 80 mm.

[m21] Surface Tension

The surface tension was measured according to JIS K6768.

[a1] Method of Pelletizing Propylene Random Copolymer Particles 100 parts by weight of a propylene random copolymer was mixed with 0.1 part by weight of tetrakis[methylene-3-(3,5-di-t-butyl-4-hydroxyphenyl)propionate]methane as an antioxidant, 0.1 part by weight of 2,4-bis(1,1-dimethyl)phosphate phenol, 0.1 part by weight of calcium stearate as a neutralizing agent, 0.15 part by weight of synthetic silica, and 0.1 part by weight of erucic acid amide, and the mixture was melt kneaded at a resin temperature of 250° C. using a KTX-30 twin screw extruder to pelletize the propylene random copolymer.

[a2] Film Molding Method

The pellet obtained by the above-described method [a1] was melted at 250° C. in a 65 mmφ extruder and extruded through a T-die to give a film having a thickness of 30 μm. The specific conditions for film molding are as follows.

Molding apparatus: SE-65 (manufactured by Toshiba Machine Co., Ltd.)
Molding temperature: Die temperature=250° C.
Die lip width: 600 mm
Chill roll temperature: 15° C.
Uptake rate: 14 m/min
Chill roll diameter: 300 mm

EXAMPLE 1

(1) Preparation of Solid Catalyst Support 300 g of $SiO_2$ (Dohkai Chemical Industries Co., Ltd.) was sampled in a 1-L sidearm flask, and 800 mL of toluene was added to produce a slurry. Then, the slurry was transferred to a 5-L four-necked flask, and 260 mL of toluene was added. 2830 mL of a solution of methylaluminoxane (hereinafter, MAO) in toluene (10 wt % solution by Albemarle Corp.) was introduced to the slurry, and the mixture was stirred for 30 minutes at room temperature. The temperature was raised to 110° C. over one hour, and the mixture was stirred for 4 hours at the same temperature. After completion of stirring, the mixture was cooled to room temperature. After cooling, the supernatant toluene was removed and replaced with fresh toluene, and the replacement was carried out until the replacement rate reached 95%.

(2) Preparation of Solid Catalyst Component (Supporting of Metal Catalyst Component Onto Catalyst Support)

In a glove box, 2.0 g of isopropylidene(3-tert-butyl-5-methylcyclopentadienyl) (fluorenyl) zirconium dichloride was weighed into a 5-L four-necked flask. The flask was taken out, 0.46 L of toluene and 1.4 L of the $MAO/SiO_2$/toluene slurry prepared in (1) above were added to the flask under nitrogen, and the mixture was stirred for 30 minutes to support the catalyst onto the support. The resulting isopropylidene(3-tert-butyl-5-methylcyclopentadienyl) (fluorenyl) zirconium dichloride/MAO/$SiO_2$/toluene slurry was subjected to 99% substitution in n-heptane, and the final slurry amount was 4.5 L. This operation was carried out at room temperature.

(3) Precursory Polymerization [P-1]

202 g of the solid catalyst component prepared in (2) above, 109 mL of triethylaluminum and 100 L of heptane were placed in an autoclave having an internal volume of 200 L and equipped with a stirrer. While the internal temperature was maintained at 15 to 20° C., 2020 g of ethylene was introduced, and reaction was carried out with stirring for 180 minutes. After completion of polymerization, the solid component was settled, and the supernatant was removed and washed twice with n-heptane. The resulting polymer precursor was resuspended in purified heptane, such that the solid catalyst component concentration was adjusted with n-heptane to 2 g/L. The polymer precursor [$P_1$] (i.e., prepolymerization catalyst) contained 10 g of polyethylene per 1 g of the solid catalyst component.

(4) Prepolymerization [P-2]

A tubular polymerization reactor with a diameter of 2.5 cm and having an internal volume of 58 L (hereinafter, used in the prepolymerization process in all of the following Examples and Comparative Examples), was continuously supplied with 45 kg/hr of propylene, 9 NL/hr of hydrogen, 4.2 g/hr of the catalyst slurry prepared in (3) above, as the solid catalyst component, and 3.5 mL/hr of triethylaluminum, and polymerization was carried out in a full liquid state free of gas phase. The temperature in the tubular reactor was 30° C., and the pressure was 3.0 MPa·G.

(5) Actual Polymerization [P-3]

The obtained prepolymer slurry was sent to a vessel polymerization reactor having an internal volume of 1000 L and equipped with a stirrer, and was further subjected to polymerization. The polymerization reactor was supplied with 72 kg/hr of propylene, 15 NL/hr of hydrogen and 0.75 kg/hr of ethylene. Polymerization was carried out at a polymerization temperature of 70° C. and a pressure of 2.9 MPa·G. The resulting slurry was sent again to a vessel polymerization reactor having an internal volume of 500 L and equipped with a stirrer, and was further subjected to polymerization. The polymerization reactor was supplied with 16 kg/hr of propylene, 10 NL/hr of hydrogen and 0.5 kg/hr of ethylene. Polymerization was carried out at a polymerization temperature of 69° C. and a pressure of 2.8 MPa·G.

(6) Pelletization

The resulting polypropylene random copolymer was pelletized according to the above-described molding/processing method [a1] pelletization method.

(7) Film Molding

A film was produced from the pellet obtained in (6) above according to the above-described molding/processing method [a2] film molding method.

The primary nature of the resulting polymer and the properties of the film obtained therefrom are presented in Table 1.

EXAMPLE 2

The entire process was carried out in the same manner as in Example 1, except that the method of polymerization in the actual polymerization process [P-3] was changed as follows.

(1) Actual Polymerization [P-3]

A prepolymer slurry was obtained in the same manner as in the processes [P-1] and [P-2] of Example 1. The obtained slurry was sent to a vessel polymerization reactor having an internal volume of 1000 L and equipped with a stirrer, and was further subjected to polymerization. The polymerization reactor was supplied with 72 kg/hr of propylene, 15 NL/hr of hydrogen and 0.75 kg/hr of ethylene. Polymerization was carried out at a polymerization temperature of 70° C. and a pressure of 2.9 MPa·G.

The resulting slurry was sent again to a vessel polymerization reactor having an internal volume of 500 L and equipped with a stirrer and was further subjected to polymerization. The polymerization reactor was supplied with 16 kg/hr of propylene, 10 NL/hr of hydrogen, 0.6 kg/hr of ethylene and 2.5 kg/hr of 1-butene. Polymerization was carried out at a polymerization temperature of 69° C. and a pressure of 2.8 MPa·G.

(2) Pelletization and Film Production 100 parts by weight of the propylene random copolymer obtained in the above was pelletized according to the above-described molding/processing method [a1] pelletization method, and a film was produced therefrom according to the above-described molding/processing method [a2] film molding method.

The primary nature of the resulting polymer and the properties of the film obtained therefrom are presented in Table 1.

COMPARATIVE EXAMPLE 1

The entire process was carried out in the same manner as in Example 1, except that the prepolymerization process [P-2] and the actual polymerization process [P-3] were changed as follows.

(1) Prepolymerization [P-2]

A tubular polymerization reactor having an internal volume of 58 L was continuously supplied with 45 kg/hr of propylene, 9 NL/hr of hydrogen, 4.2 g/hr of the catalyst slurry obtained according to the method as described for the precursory polymerization process [P-1] of Example 1, as the solid catalyst component, 3.5 mL/hr of triethylaluminum and 0.08 kg/hr of ethylene, and polymerization was carried out in a full liquid state free of gas phase. The temperature of the tubular reactor was 30° C., and the pressure was 3.0 MPa·G.

(2) Actual Polymerization [P-3]

The obtained slurry was sent to a vessel polymerization reactor having an internal volume of 1000 L and equipped with a stirrer, and was further subjected to polymerization. The polymerization reactor was supplied with 72 kg/hr of propylene, 15 NL/hr of hydrogen and 0.75 kg/hr of ethylene. Polymerization was carried out at a polymerization temperature of 70° C. and a pressure of 2.9 MPa·G.

The resulting slurry was sent again to a vessel polymerization reactor having an internal volume of 500 L and equipped with a stirrer, and was further subjected to polymerization. The polymerization reactor was supplied with 16 kg/hr of propylene, 10 NL/hr of hydrogen and 0.5 kg/hr of ethylene. Polymerization was carried out at a polymerization temperature of 69° C. and a pressure of 2.8 MPa·G.

(3) Pelletization and Film Production 100 parts by weight of the propylene random copolymer obtained in the above was pelletized according to the above-described molding/processing method [a1] pelletization method, and a film was produced therefrom according to the above-described molding/processing method [a2] film molding method.

The primary nature of the resulting polymer and the properties of the film obtained therefrom are presented in Table 1.

COMPARATIVE EXAMPLE 2

The entire process was carried out in the same manner as in Example 1, except that the prepolymerization process [P-2] and the actual polymerization process [P-3] were changed as follows, and a polypropylene homopolymer was prepared by the following polymerization method.

(1) Prepolymerization [P-2]

A tubular polymerization reactor having an internal volume of 58 L was continuously supplied with 45 kg/hr of propylene, 9 NL/hr of hydrogen, 4.2 g/hr of the catalyst slurry obtained according to the method as described for the precursory polymerization process [P-1] of Example 1, as the solid catalyst component, and 3.5 mL/hr of triethylaluminum, and polymerization was carried out in a full liquid state free of gas phase. The temperature of the tubular reactor was 30° C., and the pressure was 3.0 MPa·G.

(2) Actual Polymerization [P-3]

The obtained slurry was sent to a vessel polymerization reactor having an internal volume of 1000 L and equipped with a stirrer, and was further subjected to polymerization. The polymerization reactor was supplied with 72 kg/hr of propylene and 15 NL/hr of hydrogen. Polymerization was carried out at a polymerization temperature of 70° C. and a pressure of 2.9 MPa·G.

The resulting slurry was sent again to a vessel polymerization reactor having an internal volume of 500 L and equipped with a stirrer, and was further subjected to polymerization. The polymerization reactor was supplied with 16 kg/hr of propylene and 10 NL/hr of hydrogen. Polymerization was carried out at a polymerization temperature of 69° C. and a pressure of 2.8 MPa·G.

(3) Pelletization and Film Production 100 parts by weight of a polypropylene resin comprising 6 parts by weight of the polypropylene homopolymer obtained in the above and 94 parts by weight of the propylene copolymer prepared in Comparative Example 1, was pelletized according to the above-described molding/processing method [a1] pelletization method, and a film was produced therefrom according to the above-described molding/processing method [a2] film molding method.

The primary nature of the resulting polymer and the properties of the film obtained therefrom are presented in Table 1.

COMPARATIVE EXAMPLE 3

(1) Preparation of Solid Titanium Catalyst Component 952 g of anhydrous magnesium chloride, 4420 mL of n-decane and 3906 g of 2-ethylhexyl alcohol were heated at 130° C. for 2 hours to form a homogeneous solution. 213 g of phthalic anhydride was added to this solution, and the phthalic anhydride was dissolved therein by mixing with stirring at 130° C. for 1 hour.

The homogeneous solution thus obtained was cooled to 23° C., and then 750 mL of this homogeneous solution was added dropwise to 2000 mL of titanium tetrachloride maintained at −20° C. over 1 hour. After the dropwise addition, the temperature of the resulting liquid mixture was elevated to 110° C. over 4 hours. When the temperature reached 110° C., 52.2 g of diisobutyl phthalate (DIBP) was added, and the mixture was stirred for another 2 hours, with the temperature being maintained the same. Then, the solid fraction was collected by hot-filtration, and the solid fraction was resuspended in 2750 mL of titanium tetrachloride and heated again at 110° C. for 2 hours.

After completion of heating, the solid fraction was collected again by hot-filtration and washed with n-decane and n-hexane at 110° C., until no titanium compound was detected in the washing liquid.

The solid titanium catalyst component thus prepared was stored as a hexane slurry, but a fraction thereof was dried for examination of the catalyst composition. The solid titanium catalyst component contained 3% by weight of titanium, 58% by weight of chlorine, 18% by weight of magnesium, and 21% by weight of DIBP.

(2) Precursory Polymerization

A 10-L autoclave equipped with a stirrer was charged with 7 L of purified heptane, 0.16 mol of triethylaluminum, and 0.053 mol (in terms of titanium atoms) of the solid titanium catalyst component obtained in the above, under a nitrogen atmosphere. 900 g of propylene was introduced to the autoclave, and reaction was carried out for 1 hour, with the temperature being maintained at 5° C. or lower.

After completion of polymerization, the reactor was purged with nitrogen, and the supernatant was removed and washed three times with purified heptane. The resulting prepolymerization catalyst was resuspended in purified heptane and transferred to a catalyst supplying tank, where the solid titanium catalyst component concentration was adjusted with purified heptane to 1 g/L. The polymer precursor (prepolymerization catalyst) thus obtained contained 10 g of polypropylene per 1 g of the solid titanium catalyst component.

(3) Polymerization

A polymerization tank 1 having an internal volume of 100 L and equipped with a stirrer was charged with 66 L of liquefied propylene, and while maintaining the liquid level, 110 kg/hr of liquefied propylene, 1.2 g/hr of the polymer precursor (prepolymerization catalyst), 5.4 mL/hr of triethylaluminum, 9.9 mL/hr of cyclohexylmethyldimethoxysilane, and 0.09 kg/hr of ethylene were continuously supplied to the tank, where polymerization was carried out at a temperature of 66° C. Hydrogen was continuously supplied so as to maintain the gas phase concentration in the polymerization tank 1 at 0.7% by mole. The resulting polymer was transferred, still in the slurry state, to a polymerization tank 2 having an internal volume of 1000 L and equipped with a stirrer.

Figure 2:
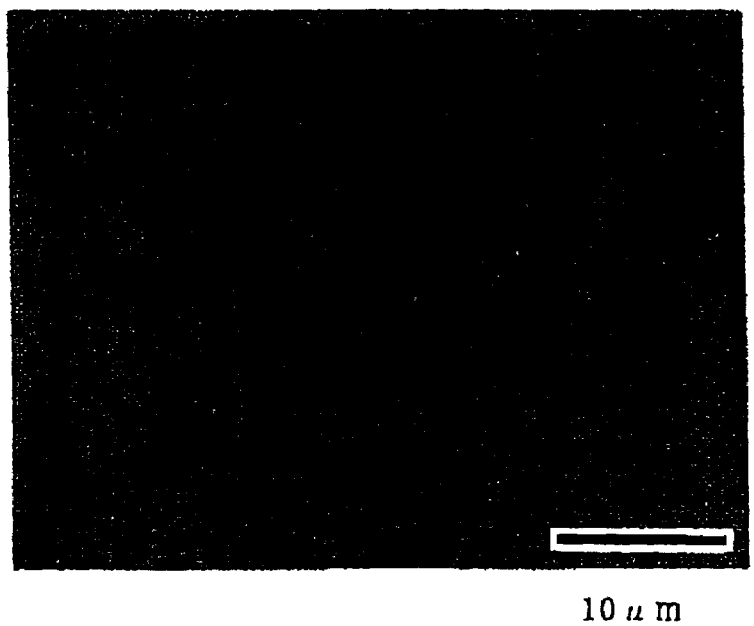
FIG. 2 is a transmission electron microscope (TEM) photograph of the core [L3] of the propylene random copolymer particle (Comparative Example 3) obtained by using a conventional Ziegler-Natta catalyst.
Figure 3:
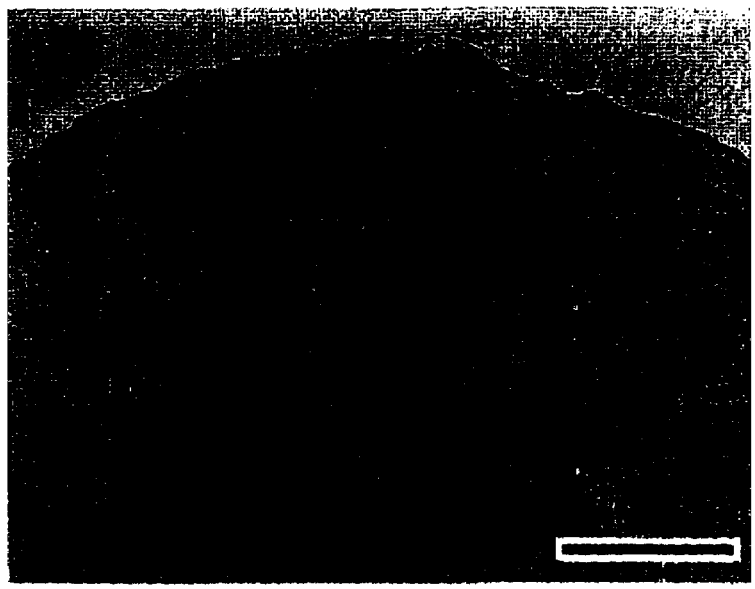
FIG. 3 is a transmission electron microscope (TEM) photograph of the vicinity of the first skin layer [L1] of the propylene random copolymer particle (Comparative Example 3) obtained by using a conventional Ziegler-Natta catalyst.

In the polymerization tank 2, 20 kg/hr of liquefied propylene, 2.1 kg/hr of ethylene and 11.2 kg/hr of 1-butene were freshly continuously supplied, while maintaining the liquid level at 300 liters, and polymerization was carried out at a temperature of 67° C. Hydrogen was also continuously supplied so as to maintain the gas phase concentration in the polymerization tank 2 at 2.2% by mole for the polymerization. The resulting propylene random copolymer particles were subjected to TEM according to the above-described analytic method [m11], and photographs obtained therefrom are shown in FIG. 2 and FIG. 3.

The propylene random copolymer particles were pelletized in the same manner as in Example 1, thus to produce a film.

The primary nature of the resulting polymer and the properties of the film obtained therefrom are presented in Table 1.

were placed in an autoclave having an internal volume of 200 L and equipped with a stirrer. While the internal temperature was maintained at 15 to 20° C., 2020 g of ethylene was introduced, and reaction was carried out with stirring for 180 minutes. After completion of polymerization, the solid component was settled, and the supernatant was removed and washed twice with n-heptane. [The rate of catalyst washing calculated from the amount of the introduced solvent (n-heptane) and the amount of the recovered solvent was 99%.] The resulting polymer precursor was resuspended in purified n-heptane, such that the solid catalyst component concentration was adjusted with n-heptane to 2 g/L. A fraction of the polymer precursor was sampled and analyzed. The polymer precursor contained 10 g of polyethylene per 1 g of the solid catalyst component.

TABLE 1

|  | Unit | Example 1 | Example 2 | Comp. Ex. 1 | Comp. Ex. 2 | Comp. Ex. 3 |
|---|---|---|---|---|---|---|
| Amount of X component | wt % | 6 | 6.1 | 0 | 6 | 0 |
| Amount of Y component | wt % | 94 | 60 | 100 | 94 | 22 |
| Amount of W component | wt % | 0 | 34 | 0 | 0 | 78 |
| MFR | g/10 min | 9.9 | 9.8 | 9.5 | 9.7 | 7 |
| Content of $C_2^-$ | wt % | 2.8 | 3.2 | 2.7 | 2.5 | 3.4 |
| Content of $C_4^-$ | wt % | — | 3.8 | — | — | 2.3 |
| Mw/Mn | — | 2 | 2.1 | 2 | 2.1 | 3.7 |
| $nC_{10}$-soluble fraction | wt % | <0.5 | <0.5 | <0.5 | <0.5 | 4.9 |
| Tm | ° C. | 128.8 | 115 | 129.5 | 129.6 | 129 |
| Heat seal strength (130° C.) | N/15 mm | 2.2 | 6.8 | 2.3 | 2.0 | 2.3 |
| HAZE | % | 1.1 | 0.8 | 1.4 | 1.5 | 1.2 |

X component: Propylene homopolymer
Y component: Copolymer obtained from propylene and ethylene
W component: Copolymer obtained from propylene, ethylene and an α-olefin having 4 or more carbon atoms The amount of Y component in the cases where ethylene and propylene were copolymerized in both the second process and the third process, is the total amount of the Y component produced in the second process ($=Y_1$) and the Y component produced in the third process ($=Y_2$).

EXAMPLE 3

(1) Preparation of Solid Catalyst Component (Supporting of Metal Catalyst Component Onto Catalyst Support)

In a glove box, 2.0 g of diphenylmethylene(3-tert-butyl-5-methylcyclopentadienyl)(2,7-di-tert-butylfluorenyl)zirconium dichloride was weighed into a 5-L four-necked flask. The flask was taken out, 0.46 L of toluene and 1.4 L of the MAO/SiO$_2$/toluene slurry prepared by the same method as in (1) of Example 1 were added to the flask under nitrogen, and the mixture was stirred for 30 minutes to support the catalyst onto the support. The resulting diphenylmethylene(3-tert-butyl-5-methylcyclopentadienyl) (2,7-di-tert-butylfluorenyl) zirconium dichloride/MAO/SiO$_2$ toluene slurry was subjected to 99% substitution in n-heptane, and the final slurry amount was 4.5 L. This operation was carried out at room temperature.

(2) Precursory Polymerization [P-1]

202 g of the solid catalyst component prepared in (1) above, 109 mL of triethylaluminum and 100 L of n-heptane (3) Prepolymerization [P-2]

A tubular polymerization reactor having an internal volume of 58 L was continuously supplied with 57 kg/hr of propylene, 4 NL/hr of hydrogen, 7.1 g/hr of the catalyst slurry of the polymer precursor prepared in (2) above, as the solid catalyst component, and 4.0 mL/hr of triethylaluminum, and polymerization was carried out in a full liquid state free of gas phase. The temperature in the tubular reactor was 30° C., and the pressure was 2.6 MPa·G.

(4) Actual Polymerization [P-3]

The slurry obtained in the above-described (3) prepolymerization was sent to a vessel polymerization reactor having an internal volume of 1000 L and equipped with a stirrer, and was further subjected to polymerization. The polymerization reactor was supplied with 50 kg/hr of propylene, 1.7 kg/hr of ethylene, and hydrogen in an amount that the hydrogen concentration in the gas phase was 0.16% by mole. Polymerization was carried out at a polymerization temperature of 60° C. and a pressure of 2.5 MPa·G.

The resulting slurry was sent again to a vessel polymerization reactor having an internal volume of 500 L and equipped with a stirrer, and was further subjected to polymerization. The polymerization reactor was supplied with 11 kg/hr of propylene, 1.2 kg/hr of ethylene, and hydrogen in an amount to maintain the hydrogen concentration in the gas phase at 0.16% by mole. Polymerization was carried out at a polymerization temperature of 59° C. and a pressure of 2.4 MPa·G.

The resulting slurry was vaporized, and vapor-solid separation was carried out to yield a propylene copolymer. The propylene copolymer obtained therefrom was dried in vacuo at 80° C. The results are presented in Table 2.

EXAMPLE 4

The entire process was carried out in the same manner as in Example 3, except that the prepolymerization process and the actual polymerization process were changed as follows.

(1) Prepolymerization [P-2]

A tubular polymerization reactor having an internal volume of 58 L was continuously supplied with 57 kg/hr of propylene, 4 NL/hr of hydrogen, 6.5 g/hr of the catalyst slurry prepared by the same method as described for (2) precursory polymerization of Example 3 above, as the solid catalyst component, and 3.6 mL/hr of triethylaluminum, and polymerization was carried out in a full liquid state free of gas phase. The temperature of the tubular reactor was 30° C., and the pressure was 2.6 MPa·G.

(2) Actual Polymerization [P-3]

The slurry obtained by the prepolymerization was sent to a vessel polymerization reactor having an internal volume of 1000 L and equipped with a stirrer, and was further subjected to polymerization. The polymerization reactor was supplied with 50 kg/hr of propylene, 1.5 kg/hr of ethylene, and hydrogen in an amount to maintain the hydrogen concentration in the gas phase at 0.33% by mole. Polymerization was carried out at a polymerization temperature of 60° C. and a pressure of 2.5 MPa·G.

The resulting slurry was sent again to a vessel polymerization reactor having an internal volume of 500 L and equipped with a stirrer, and was further subjected to polymerization. The polymerization reactor was supplied with 11 kg/hr of propylene, 1.0 kg/hr of ethylene, and hydrogen in an amount to maintain the hydrogen concentration in the gas phase at 0.33% by mole. Polymerization was carried out at a polymerization temperature of 59° C. and a pressure of 2.4 MPa·G.

The resulting slurry was vaporized, and vapor-solid separation was carried out to yield a propylene copolymer. The propylene copolymer obtained therefrom was dried in vacuo at 80° C. The results are presented in Table 2.

EXAMPLE 5

The entire process was carried out in the same manner as in Example 3, except that the prepolymerization process and the actual polymerization process were changed as follows.

(1) Prepolymerization [P-2]

A tubular polymerization reactor having an internal volume of 58 L was continuously supplied with 57 kg/hr of propylene, 4 NL/hr of hydrogen, 4.9 g/hr of the catalyst slurry prepared by the same method as described for (2) precursory polymerization of Example 3 above, as the solid catalyst component, and 2.7 mL/hr of triethylaluminum, and polymerization was carried out in a full liquid state free of gas phase. The temperature of the tubular reactor was 30° C., and the pressure was 2.6 MPa·G.

(2) Actual Polymerization [P-3]

The slurry obtained by the prepolymerization was sent to a vessel polymerization reactor having an internal volume of 1000 L and equipped with a stirrer, and was further subjected to polymerization. The polymerization reactor was supplied with 50 kg/hr of propylene, 1.5 kg/hr of ethylene, 2.7 kg/hr of 1-butene, and hydrogen in an amount to maintain the hydrogen concentration in the gas phase at 0.33% by mole. Polymerization was carried out at a polymerization temperature of 60° C. and a pressure of 2.5 MPa·G.

The resulting slurry was sent again to a vessel polymerization reactor having an internal volume of 500 L and equipped with a stirrer, and was further subjected to polymerization. The polymerization reactor was supplied with 11 kg/hr of propylene, 1.0 kg/hr of ethylene, and hydrogen in an amount to maintain the hydrogen concentration in the gas phase at 0.33% by mole. Polymerization was carried out at a polymerization temperature of 59° C. and a pressure of 2.4 MPa·G.

The resulting slurry was vaporized, and vapor-solid separation was carried out to yield a propylene random copolymer. The propylene random copolymer obtained therefrom was dried in vacuo at 80° C. The results are presented in Table 2.

COMPARATIVE EXAMPLE 4

(1) Preparation of Solid Catalyst (Supporting of Metal Catalyst Component Onto Catalyst Support)

In a glove box, 2.0 g of dimethylsilylenebis(2-methyl-4-phenylindenyl)zirconium dichloride was weighed into a 5-L four-necked flask. The flask was taken out, 0.46 L of toluene and 1.4 L of the $MAO/SiO_2$/toluene slurry prepared by the same method as described for (1) of Example 1, as the solid catalyst support, were added to the flask under nitrogen, and the mixture was stirred for 30 minutes to support the catalyst onto the support. The resulting dimethylsilylenebis(2-methyl-4-phenylindenyl)zirconium dichloride/$MAO/SiO_2$/toluene slurry was subjected to 99% substitution in n-heptane, and the final slurry amount was 4.5 L. This operation was carried out at room temperature.

(2) Precursory Polymerization [P-1]

202 g of the solid catalyst component prepared in the above-described section for preparation of solid catalyst, 109 mL of triethylaluminum and 100 L of n-heptane were introduced into an autoclave having an internal volume of 200 L and equipped with a stirrer. While the internal temperature was maintained at 15 to 20° C., 2020 g of ethylene was introduced, and reaction was carried out with stirring for 180 minutes. After completion of polymerization, the solid component was settled, and the supernatant was removed and washed twice with n-heptane. The resulting polymer precursor was resuspended in purified heptane, such that the solid catalyst component concentration was adjusted with n-heptane to 2 g/L. A fraction of the polymer precursor was sampled and analyzed. The polymer precursor contained 10 g of polyethylene per 1 g of the solid catalyst component.

(3) Prepolymerization [P-2]

A tubular polymerization reactor having an internal volume of 58 L was continuously supplied with 57 kg/hr of propylene, 4 NL/hr of hydrogen, 4.7 g/hr of the catalyst slurry prepared by precursory polymerization, as the solid catalyst component, and 3.1 mL/hr of triethylaluminum, and polymerization was carried out in a full liquid state free of gas phase. The temperature in the tubular reactor was 30° C., and the pressure was 2.6 MPa·G.

(4) Actual Polymerization [P-3]

The slurry obtained by the (3) prepolymerization was sent to a vessel polymerization reactor having an internal volume of 1000 L and equipped with a stirrer, and was further subjected to polymerization. The polymerization reactor was supplied with 50 kg/hr of propylene, 2.2 kg/hr of ethylene, and hydrogen in an amount to maintain the hydrogen concentration in the gas phase at 0.15% by mole. Polymerization was carried out at a polymerization temperature of 60° C. and a pressure of 2.5 MPa·G.

The resulting slurry was sent again to a vessel polymerization reactor having an internal volume of 500 L and equipped with a stirrer, and was further subjected to polymerization. The polymerization reactor was supplied with 11 kg/hr of propylene, 1.5 kg/hr of ethylene and hydrogen in an amount to maintain the hydrogen concentration in the gas phase at 0.09% by mole. Polymerization was carried out at a polymerization temperature of 59° C. and a pressure of 2.4 MPa·G.

The resulting slurry was vaporized, and vapor-solid separation was carried out to yield a propylene random copolymer. The propylene random copolymer obtained therefrom was dried in vacuo at 80° C. The results are presented in Table 2.

TABLE 2

| | | Example 3 | Example 4 | Example 5 | Comp. Ex. 4 | Comp. Ex. 5 |
|---|---|---|---|---|---|---|
| Metallocene compound catalyst component | | Diphenylmethylene (3-t-butyl-5-methylcyclopentadienyl)(2,7-di-t-butylfluorenyl) zirconium dichloride | | | Dimethylsilylenebis(2-methyl-4-phenylindenyl)zirconium dichloride | |
| Conc. of skeletal constituent derived from ethylene | mol % | 8.0 | 6.8 | 6.9 | 8.7 | 6.3 |
| Conc. of skeletal constituent derived from butene-1 | mol % | 0 | 0 | 1.1 | 0 | 0 |
| 1,2-bonding | mol % | 0.06 | 0.06 | 0.06 | 0.8 | 0.8 |
| 1,3-bonding | mol % | 0 | 0 | 0 | 0.05 | 0.05 |
| Tm | ° C. | 113 | 120 | 113 | 113 | 118 |
| Mw/Mn | | 2.1 | 2.2 | 1.9 | 2.7 | 2.2 |
| MFR | g/10 min | 1.5 | 7 | 6 | 8 | 2.6 |
| Amount of $nC_{10}$-soluble fraction | wt % | 0.5 | 0.5 | 0.9 | 5.4 | 2.9 |
| Amount of components eluted with ODCB at 40° C. or lower | wt % | 0.3 | 0.3 | 0.5 | 5.0 | 2.5 |

0.15% by mole. Polymerization was carried out at a polymerization temperature of 59° C. and a pressure of 2.4 MPa·G.

The resulting slurry was vaporized, and vapor-solid separation was carried out to yield a propylene random copolymer. The propylene random copolymer obtained therefrom was dried in vacuo at 80° C. The results are presented in Table 2.

COMPARATIVE EXAMPLE 5

The entire process was carried out in the same manner as in Comparative Example 4, except that the actual polymerization process was changed as follows.

(1) Actual Polymerization [P-3]

The slurry obtained by the same method as described for (3) prepolymerization of Comparative Example 4 was sent to a vessel polymerization reactor having an internal volume of 1000 L and equipped with a stirrer, and was further subjected to polymerization. The polymerization reactor was supplied with 50 kg/hr of propylene, 1.6 kg/hr of ethylene, and hydrogen in an amount to maintain the hydrogen concentration in the gas phase at 0.09% by mole. Polymerization was carried out at a polymerization temperature of 60° C. and a pressure of 2.5 MPa·G.

The resulting slurry was sent again to a vessel polymerization reactor having an internal volume of 500 L and equipped with a stirrer, and was further subjected to polymerization. The polymerization reactor was supplied with 11 kg/hr of propylene, 1.1 kg/hr of ethylene, and hydrogen in an amount to maintain the hydrogen concentration in the gas phase at

EXAMPLE 6

The entire process was carried out in the same manner as in Example 3, except that the prepolymerization process and the actual polymerization process were changed as follows.

(1) Prepolymerization [P-2]

A tubular polymerization reactor having an internal volume of 58 L was continuously supplied with 50 kg/hr of propylene, 4 NL/hr of hydrogen, 5.0 g/hr of the catalyst slurry of the polymer precursor prepared by the same method as described for section (2) of Example 3, as the solid catalyst component, and 2.4 g/hr of triethylaluminum, and polymerization was carried out in a full liquid state free of gas phase. The temperature of the tubular reactor was 30° C., and the pressure was 2.6 MPa·G. Although the occurrence of fouling was not recognized during the prepolymerization, a trace amount (about 2% by weight of the total prepolymer) of an aggregated powder which did not pass through a 10-mesh screen was observed in the polymerization tank.

(2) Actual Polymerization [P-3]

The slurry obtained by the above-described prepolymerization was sent to a vessel polymerization reactor having an internal volume of 1000 L and equipped with a stirrer, and was further subjected to polymerization. The polymerization reactor was supplied with 40 kg/hr of propylene, 1.8 kg/hr of ethylene, and hydrogen in an amount to maintain the hydrogen concentration in the gas phase at 0.16% by mole. Polymerization was carried out at a polymerization temperature of 60° C. and a pressure of 2.5 MPa·G. In addition, although the occurrence of fouling was not recognized during the first stage of the actual polymerization process, a trace amount (0.5% by weight or less of the total polymer) of an aggregated powder which did not pass through a 10-mesh screen was observed in the polymerization tank.

The resulting slurry was sent again to a vessel polymerization reactor having an internal volume of 500 L and equipped with a stirrer, and was further subjected to polymerization. The polymerization reactor was supplied with 15 kg/hr of propylene, 0.6 kg/hr of ethylene, and hydrogen in an amount to maintain the hydrogen concentration in the gas phase at 0.16% by mole. Polymerization was carried out at a polymerization temperature of 59° C. and a pressure of 2.4 MPa·G. In addition, although the occurrence of fouling was not recognized during the second stage of the actual polymerization process, a trace amount (0.5% by weight or less of the total polymer) of an aggregated powder which did not pass through a 10-mesh screen was observed in the polymerization tank.

The resulting slurry was vaporized, and vapor-solid separation was carried out to yield propylene polymer particles. The propylene polymer particles obtained therefrom were dried in vacuo at 80° C. The results are presented in Table 3 and 4. Further, the obtained propylene random copolymer particles were subjected to TEM according to the above-described analytic method [m11], and photographs obtained therefrom are presented in FIG. 4 and FIG. 5.

COMPARATIVE EXAMPLE 6

The entire process was carried out in the same manner as in Example 6, except that the precursory polymerization process was changed as follows.

(1) Precursor Polymerization [P-1]

202 g of the solid catalyst component prepared by the same method as described in section (1) of Example 3, 109 mL of triethylaluminum, and 100 L of n-heptane were introduced into an autoclave having an internal volume of 200 L and equipped with a stirrer. While the internal temperature was maintained at 15 to 20° C., 2020 g of propylene was gradually introduced, and reaction was carried out with stirring for 5 hours. After completion of polymerization, the solid component was settled, and the supernatant was removed and washed twice with heptane. The resulting polymer precursor catalyst was resuspended in purified heptane, such that the concentration of the solid catalyst component was adjusted with n-heptane to 2 g/L. A fraction of the polymer precursor was sampled and analyzed. The polymer precursor contained 10 g of polypropylene per 1 g of the solid catalyst component.

The polymer precursor was used to give a prepolymer slurry according to the same method as described for (1) prepolymerization of Example 6.

(2) Actual Polymerization [P-3]

Actual polymerization using the slurry obtained from the above-described prepolymerization was attempted by the same method as described for (2) actual polymerization of Example 6. But, since fouling was so severe that the polymerization reaction was not stabilized, the polymerization process was stopped in the middle of the course.

The results are presented in Table 3.

COMPARATIVE EXAMPLE 7

The entire process was carried out in the same manner as in Example 6, except that the prepolymerization process and the actual polymerization process were changed as follows.

(1) Prepolymerization [P-2]

Prepolymerization was not carried out.

(2) Actual Polymerization [P-3]

A vessel polymerization reactor having an internal volume of 1000 L and equipped with a stirrer was supplied with 90 kg/hr of propylene, 1.8 kg/hr of ethylene, and hydrogen in an amount to maintain the hydrogen concentration in the gas phase at 0.16% by mole. Further, 5.0 g/hr of the catalyst slurry prepared in the precursory polymerization, as the solid catalyst component, and 2.4 g/hr of triethylaluminum were supplied to the reactor, and polymerization was carried out at a polymerization temperature of 60° C. and a pressure of 2.5 MPa·G.

The resulting slurry was sent again to a vessel polymerization reactor having an internal volume of 500 L and equipped with a stirrer, and was further subjected to polymerization. The polymerization reactor was supplied with 15 kg/hr of propylene, 0.6 kg/hr of ethylene, and hydrogen in an amount to maintain the hydrogen concentration in the gas phase at 0.16% by mole. Polymerization was carried out at a polymerization temperature of 59° C. and a pressure of 2.4 MPa·G.

Actual polymerization was attempted as described above. But, since fouling was observed during the first stage of the actual polymerization process, and fouling was so severe in the second stage of the actual polymerization process that the polymerization reaction was not stabilized, the polymerization process was stopped in the middle of the course. The results are presented in Table 3.

COMPARATIVE EXAMPLE 8

The prepolymerization process and the actual polymerization process were carried out in the same manner as in Example 6, without carrying out precursory polymerization.

(1) Prepolymerization [P-2]

A tubular polymerization reactor having an internal volume of 58 L was continuously supplied with 50 kg/hr of propylene, 4 NL/hr of hydrogen, 5.0 g/hr of the catalyst slurry prepared by the same method as described above for the solid catalyst component of Example 6 (2), as the solid catalyst component, and 2.4 g/hr of triethylaluminum, and polymerization was carried out in a full liquid state free of gas phase. The temperature of the tubular reactor was 30° C., and the pressure was 2.6 MPa·G.

(2) Actual Polymerization [P-3]

Actual polymerization using the slurry obtained from the prepolymerization in (1) above was attempted by the same method as described for the actual polymerization of Example 6. But, since the polymerization reaction was not stabilized, the polymerization process was stopped in the middle of the course. The results are presented in Table 3.

COMPARATIVE EXAMPLE 9

The entire process was carried out in the same manner as in Example 6, except that the prepolymerization process and the actual polymerization process were changed as follows.

(1) Prepolymerization [P-2]

A tubular polymerization reactor having an internal volume of 58 L was continuously supplied with 48 kg/hr of propylene, 2.2 kg/hr of ethylene, 4 NL/hr of hydrogen, 5.0 g/hr of the catalyst slurry of the polymer precursor prepared by the same method as described in section (2) of Example 3, as the solid catalyst component, and 2.4 g/hr of triethylaluminum, and polymerization was carried out in a full liquid state free of gas phase. The temperature of the tubular reactor was 30° C., and the pressure was 2.6 MPa·G.

(2) Actual Polymerization [P-3]

Actual polymerization using the slurry obtained from the prepolymerization in (1) above was attempted by the same method as described for the actual polymerization of Example 6. But, since fouling was so severe that the polymerization reaction was not stabilized, the polymerization process was stopped in the middle of the course. The results are presented in Table 3.

COMPARATIVE EXAMPLE 10

The entire process was carried out in the same manner as in Example 6, except that the precursory polymerization was changed as follows.

(1) Precursory Polymerization [P-1]

202 g of the solid catalyst component prepared by the same method as described in section (1) of Example 3, 109 mL of triethylaluminum, and 100 L of n-heptane were introduced into an autoclave having an internal volume of 200 L and equipped with a stirrer. While the internal temperature was maintained at 15 to 20° C., 2020 g of ethylene and 0.66 NL of hydrogen were introduced, and reaction was carried out with stirring for 180 minutes. After completion of polymerization, the solid component was settled, and the supernatant was removed and washed twice with n-heptane. The resulting polymer precursor was resuspended in purified n-heptane, such that the concentration of the solid catalyst component was adjusted with n-heptane to 2 g/L. A fraction of the polymer precursor was sampled and analyzed. The polymer precursor contained 10 g of polyethylene per 1 g of the solid catalyst component. The polymer precursor was used to carry out prepolymerization and actual polymerization in the same manner as in Example 6. As a result, an occurrence of slight fouling was recognized during the prepolymerization process and the actual polymerization process. The results are represented in Table 3.

COMPARATIVE EXAMPLE 11

The entire process was carried out in the same manner as in Example 6, except that the prepolymerization process was changed as follows.

(1) Prepolymerization [P-2]

A tubular polymerization reactor having an internal volume of 58 L was continuously supplied with 50 kg/hr of propylene, 5.0 g/hr of the catalyst slurry of the polymer precursor prepared by the same method as described in section (2) of Example 3, as the solid catalyst component, and 2.4 g/hr of triethylaluminum, and polymerization was carried out in a full liquid state free of gas phase. The temperature of the tubular reactor was 30° C., and the pressure was 2.6 MPa·G. The prepolymer was used to carry out actual polymerization in the same manner as in Example 6. As a result, an occurrence of slight fouling was recognized during the actual polymerization process. The results are presented in Table 3.

COMPARATIVE EXAMPLE 12

The entire process was carried out in the same manner as in Example 6, except that the method of preparing the polymer precursor was changed as follows.

(1) Precursory Polymerization [P-1]

202 g of the solid catalyst component prepared by the same method as described in section (1) of Example 3, 109 mL of triethylaluminum, and 100 L of n-heptane were introduced into an autoclave having an internal volume of 200 L and equipped with a stirrer. While the internal temperature was maintained at 15 to 20° C., 1943 g of ethylene and 97 g of 1-hexene were introduced, and reaction was carried out with stirring for 180 minutes. After completion of polymerization, the solid component was settled, and the supernatant was removed and washed twice with heptane. The resulting polymer precursor was resuspended in purified heptane, such that the concentration of the solid catalyst component was adjusted with heptane to 2 g/L. A fraction of the polymer precursor was sampled and analyzed. The polymer precursor contained 10 g of an ethylene/1-hexene copolymer per 1 g of the solid catalyst component. The polymer precursor was used to carry out prepolymerization and actual polymerization in the same manner as in Example 6. As a result, an occurrence of slight fouling was recognized during the prepolymerization process and the actual polymerization process. The results are represented in Table 3.

EXAMPLE 7

The entire process was carried out in the same manner as in Example 6, except that the precursory polymerization process was changed as follows.

(1) Precursory Polymerization [P-1]

202 g of the solid catalyst component prepared by the same method as described in section (1) of Example 3, 109 mL of triethylaluminum, and 100 L of n-heptane were introduced into an autoclave having an internal volume of 200 L and equipped with a stirrer. While the internal temperature was maintained at 15 to 20° C., 505 g of ethylene was introduced, and reaction was carried out with stirring for 60 minutes. After completion of polymerization, the solid component was settled, and the supernatant was removed and washed twice with n-heptane. The resulting polymer precursor was resuspended in purified heptane, such that the concentration of the solid catalyst component was adjusted with n-heptane to 2 g/L. A fraction of the polymer precursor was sampled and analyzed. The polymer precursor contained 2.5 g of polyethylene per 1 g of the solid catalyst component. No occurrence of fouling was observed during the prepolymerization process and the actual polymerization process. The results are represented in Table 4.

EXAMPLE 8

The entire process was carried out in the same manner as in Example 6, except that the actual polymerization process was changed as follows.

(1) Actual Polymerization [P-3]

The slurry obtained from the prepolymerization was transferred to an insertion tube having an internal volume of 2.4 L, the slurry was vaporized, and vapor-solid separation was carried out. Then, a polypropylene powder was sent to a 480-L gas phase polymerization reactor to carry out ethylene/propylene copolymerization. Propylene, ethylene and hydrogen were continuously supplied to the gas phase polymerization reactor so that the gas composition was maintained at ethylene/(ethylene+propylene)=0.1 (molar ratio), and hydrogen/(ethylene+propylene)=0.005 (molar ratio. Polymerization was carried out at a polymerization temperature of 70° C. and a pressure of 1.3 MPa·G. The resulting propylene copolymer was dried in vacuo at 80° C. No occurrence of fouling was observed during the actual polymerization process. The results are presented in Table 4.

EXAMPLE 9

The entire process was carried out in the same manner as in Example 6, except that the precursory polymerization process was changed as follows.

(1) Precursory Polymerization [P-1]

202 g of the solid catalyst component prepared by the same method as described in section (1) of Example 3, 109 mL of triethylaluminum, and 100 L of n-heptane were introduced into an autoclave having an internal volume of 200 L and equipped with a stirrer. While the internal temperature was maintained at 15 to 20° C., 20200 g of ethylene was gradually introduced, and reaction was carried out with stirring for 25 hours. After completion of polymerization, the solid component was settled, and the supernatant was removed and washed twice with n-heptane. The resulting polymer precursor was resuspended in purified heptane, such that the concentration of the solid catalyst component was adjusted with heptane to 2 g/L. A fraction of the polymer precursor was sampled and analyzed. The polymer precursor contained 100 g of polyethylene per 1 g of the solid catalyst component. The results are represented in Table 4.

EXAMPLE 10

The entire process was carried out in the same manner as in Example 6, except that during the prepolymerization process, polyoxyalkylene glycol (tradename: Pluronic L-72, Asahi Denka Co., Ltd.; for the formula [I'] above, n=35 and m+p=12) was added in an amount of 10% by weight with respect to the solid catalyst component. As a result, no occurrence of fouling was observed in both the prepolymerization process and the actual polymerization process, and aggregated powder which did not pass through a 10-mesh screen was not generated during any of the polymerization processes. The results are presented in Table 5, together with the results of Example 6.

TABLE 3

|  |  | Example 6 | Comp. Ex. 6 | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|---|---|
| First layer (precursory polymerization) | Monomer species | Ethylene | Propylene | Ethylene | Ethylene | Ethylene | Ethylene | Ethylene | Ethylene/hexene-1 |
|  | Intrinsic viscosity [η] (dl/g) | 7 | 7 | 7 | — | 7 | 0.9 | 7 | 7 |
|  | Density (kg/m$^3$) | 950 | 900 | 950 | — | 950 | 973 | 950 | 900 |
|  | Nature$^{note1)}$ | ○ | x | ○ | — | ○ | ○ | ○ | Δ |
| Second layer (prepolymerization) | Intrinsic viscosity [η] (dl/g) | 1.7 | 1.7 | — | 1.7 | 1.7 | 1.7 | 7 | 1.7 |
|  | Melting point Tm (° C.) | 150 | 150 | — | 150 | 115 | 150 | 148 | 150 |
|  | Nature$^{note1)}$ | ○ | x | — | x | x | Δ | Δ | Δ |
| Final product | Fouling in polymerization tank$^{note2)}$ | ○ | x | x | x | x | Δ | Δ | Δ |
|  | Mw/Mn | 2.1 | — | — | — | — | 2.1 | 2.2 | 2.1 |
|  | Powder fluidity (sec) | 8.5 | — | — | — | — | 9.5 | 13.0 | 14.0 |
|  | Tm (° C.) | 113 | — | — | — | — | 113 | 113 | 113 |
|  | MFR (g/10 min) | 1.5 | — | — | — | — | 1.5 | 1.5 | 1.5 |
|  | Amount of n-decane-soluble fraction (wt %) | 1.5 | — | — | — | — | 1.5 | 1.5 | 1.5 |

$^{note1)}$○: Good, Δ: slightly poor, x: poor
$^{note2)}$○: Fouling was not recognized, or a trace of fouling was recognized. Δ: Slight fouling was recognized. x: Fouling was recognized.

TABLE 4

|  |  | Example 6 | Example 7 | Example 8 | Example 9 |
|---|---|---|---|---|---|
| First layer (precursory polymerization) | Polymerization amount of polyethylene (g/g-cat) | 10 | 2.5 | 10 | 100 |
|  | Polymerization time for polyethylene (hr) | 3 | 1 | 3 | 25 |
|  | Polymerization amount of polypropylene (g/g-cat) | — | — | — | — |
|  | Nature$^{note1)}$ | Good | Good | Good | Good |
| Second layer (prepolymerization) | Polymerization amount of polypropylene (g/g-cat) | 250 | 250 | 250 | 250 |
|  | Nature$^{note1)}$ | Good | Good | Good | Good |
| Final product | Fouling in polymerization tank | None | None | None | None |
|  | Mw/Mn | 2.1 | 2.1 | 2.1 | 2.2 |
|  | Powder fluidity (sec) | 8.5 | 8.5 | 8.5 | 8.5 |
|  | Tm (° C.) | 113 | 113 | 113 | 113 |
|  | MFR (g/10 min) | 1.5 | 1.5 | 1.5 | 1.5 |
|  | Amount of n-decane-soluble fraction (wt %) | 1.5 | 1.5 | 1.5 | 1.5 |

$^{note1)}$○: Good, Δ: slightly poor, x: poor

COMPARATIVE EXAMPLE 13

With regard to the precursory polymerization process of Example 6 (this is a process identical with the precursory polymerization of Example 3), the process was carried out in the same manner as in the precursory polymerization of Example 3, except that during the washing with n-heptane, the amount of n-heptane used was reduced, and washing was carried out once (rate of catalyst washing=90%). An attempt was made to carry out the prepolymerization process and subsequently the actual polymerization process using the polymer precursor, in the completely same method as in the prepolymerization and actual polymerization processes in Example 6. As a result, a very large amount of fouling was observed in the prepolymerization process, and thus the prepolymerization had to be stopped in the middle of the course. Upon the stopping, the amount of the aggregated powder produced in the prepolymerization tank, which did not pass through a 10-mesh screen, fully exceeded 20% by weight of the total polymer. The results are presented in Table 5, together with the results of Example 6.

COMPARATIVE EXAMPLE 14

The prepolymerization process and subsequently the actual polymerization process were carried out in the completely same manner as in the prepolymerization process and the actual polymerization process of Example 6, except that in respect to the precursory polymerization process of Example 6, the amount of n-heptane used was reduced during the washing with n-heptane, washing was carried out once (rate of catalyst washing=90%), and during the prepolymerization process, polyoxyalkylene glycol (tradename: Pluronic L-72, Asahi Denka Co., Ltd.; for the formula [I'] above, n=35 and m+p=12) was added in an amount of 10% by weight with respect to the solid catalyst component. As a result, fouling occurred to some extent during the prepolymerization process, but it was not as serious as to stop the prepolymerization process (the amount of the aggregated powder generated during the prepolymerization process, which did not pass through a 10-mesh screen, was about 20% by weight of the total polymer). Subsequently, the actual polymerization was carried out, but so large an amount of fouling was recognized that the polymerization process had to be stopped. Upon the stopping, the amount of the aggregated powder produced in the actual polymerization tank, which did not pass through a 10-mesh screen, fully exceeded 20% by weight of the total polymer. The results are presented in Table 5, together with the results of Example 6.

TABLE 5

| Item | Unit | Example 6 | Example 10 | Comp. Ex. 13 | Comp. Ex. 14 |
|---|---|---|---|---|---|
| Rate of catalyst washing[note1] | % | 99 | 99 | 90 | 90 |
| Amount of L-72 added during prepolymerization[note2] | wt % vs Bare Cat | 0 | 10 | 0 | 10 |
| Prepolymerization temperature | °C. | 30 | 30 | 30 | 30 |
| Fouling in prepolymerization tank | — | None | None | Present* | Present |
| Aggregated powder in prepolymerization tank[note3] | wt % | 2 | 0 | ≧20* | 20 |
| Fouling upon first actual polymerization | — | None | None | — | Present* |
| Aggregated powder in first actual polymerization tank[note3] | wt % | ≦0.5 | 0 | — | ≧20* |
| Fouling upon second actual polymerization | — | None | None | — | — |
| Aggregated powder in second actual polymerization tank[note3] | wt % | ≦0.5 | 0 | — | — |

[note1] Rate of catalyst washing;
[note2] L72; Asahi Denka Co., Ltd., Pluronic L-72
[note3] The ratio of the aggregated powder, which did not pass through a 10-mesh screen [sieve opening 1.7 mm], in the total polymer
In the above table, reference symbol * implies that a large amount of fouling was observed, and thus the polymerization process was stopped.

EXAMPLE 11

(1) Precursory Polymerization (P-1)

220 g of the solid catalyst component prepared by a method completely identical with the method described for the preparation of the solid catalyst component in Example 1, 202 mL of triethylaluminum and 110 L of n-heptane were introduced into an autoclave having an internal volume of 200 L and equipped with a stirrer. While the internal temperature was maintained at 15 to 20° C., 3080 g of ethylene was introduced, and polymerization was carried out with stirring for 180 minutes. After completion of polymerization, the solid component was settled, and the supernatant was removed and washed twice with n-heptane. The resulting prepolymerization catalyst was resuspended in purified n-heptane, such that the solid catalyst component concentration was adjusted with n-heptane to 2 g/L. The polymer precursor contained 10 g of polyethylene per 1 g of the solid catalyst component.

(2) Prepolymerization [P-2]

A tubular polymerization reactor having an internal volume of 58 L was continuously supplied with 28 kg/hr of propylene, 3 NL/hr of hydrogen, 4.4 g/hr of the catalyst slurry of the polymer precursor prepared in (1) above, as the solid catalyst component, and 2.4 mL/hr of triethylaluminum, and polymerization was carried out in a full liquid state free of gas phase. The temperature of the tubular reactor was 30° C., and the pressure was 2.8 MPa·G.

(3) Actual Polymerization [P-3a]

The resulting slurry was sent to a vessel polymerization reactor having an internal volume of 1000 L and equipped with a stirrer, and was further subjected to polymerization. The polymerization reactor was supplied with 65 kg/hr of propylene and 10 NL/hr of hydrogen. Polymerization was carried out at a polymerization temperature of 66° C. and a pressure of 2.6 MPa·G.

(4) Actual Polymerization [P-3b]

Further, the resulting slurry was sent to a vessel polymerization reactor having an internal volume of 500 L and equipped with a stirrer, and was further subjected to polymerization. The polymerization reactor was supplied with 16 kg/hr of propylene, 7 NL/hr of hydrogen, and 1.5 kg/hr of ethylene. Polymerization was carried out at a polymerization temperature of 60° C. and a pressure of 2.5 MPa·G.

(5) Pelletization

The resulting polypropylene random copolymer was subjected to pelletization according to the above-described molding/processing method [a1] pelletization method.

(6) Film Molding

A film was produced from the pellet obtained in (5) above according to the above-described molding/processing method [a2] film molding method.

The primary nature of the resulting polymer and the properties of the film obtained therefrom are presented in Table 6.

COMPARATIVE EXAMPLE 15

The entire process was carried out in the same manner as in Example 11, except that the polymerization method was changed as follows. The fundamental difference from Example 11 was that the actual polymerization [P-3a] was omitted, and the process was jumped from the prepolymerization [P-2]) to the actual polymerization [P-3b]).

(1) Prepolymerization [P-2]

A tubular polymerization reactor having an internal volume of 58 L was continuously supplied with 28 kg/hr of propylene, 3 NL/hr of hydrogen, 4.4 g/hr of the catalyst slurry as the solid catalyst component, and 2.4 mL/hr of triethylaluminum, and polymerization was carried out in a full liquid state free of gas phase. The temperature of the tubular reactor was 30° C., and the pressure was 2.7 MPa·G.

(2) Actual Polymerization [P-3b]

The resulting slurry was sent to a vessel polymerization reactor having an internal volume of 1000 L and equipped with a stirrer, and was further subjected to polymerization. The polymerization reactor was supplied with 69 kg/hr of propylene, 10 NL/hr of hydrogen and 1.6 kg/hr of ethylene. Polymerization was carried out at a polymerization temperature of 60° C. and a pressure of 2.6 MPa·G.

Furthermore, the resulting slurry was sent to a vessel polymerization reactor having an internal volume of 500 L and equipped with a stirrer, and was further subjected to polymerization. The polymerization reactor was supplied with 10 kg/hr of propylene, 7 NL/hr of hydrogen and 0.6 kg/hr of ethylene. Polymerization was carried out at a polymerization temperature of 50° C. and a pressure of 2.5 MPa·G.

The propylene random copolymer thus obtained was pelletized and molded into a film by the same method as described in Example 11.

The primary nature of the resulting polymer and the properties of the film obtained thereof are presented in Table 6.

COMPARATIVE EXAMPLE 16

(1) Precursory Polymerization [P-1]

A 10-L autoclave equipped with a stirrer was charged with 7 L of purified n-heptane, 68 mL of triethylaluminum, and 170 g of the solid titanium catalyst component obtained by the same method as described in Comparative Example 3 under a nitrogen atmosphere. 260 g of propylene was introduced to the autoclave, and reaction was carried out for 1 hour, with the temperature being maintained at 5° C. or lower.

After completion of polymerization, the reactor was purged with nitrogen, and the supernatant was removed and washed three times with purified n-heptane. The resulting polymer precursor was resuspended in purified n-heptane and transferred to a catalyst supplying tank, where the solid titanium catalyst component concentration was adjusted with purified n-heptane to 1 g/L. The polymer precursor thus obtained contained 10 g of polypropylene per 1 g of the solid titanium catalyst component.

(2) Actual Polymerization [P-3b]

A polymerization tank 1 having an internal volume of 500 L and equipped with a stirrer was charged with 300 L of liquefied propylene, and while maintaining the liquid level, 137 kg/hr of liquefied propylene, 1.9 g/hr of the polymer precursor prepared in (1) above, 5.0 mL of triethylaluminum, 7.1 mL/hr of cyclohexylmethyldimethoxysilane, and 2.8 kg/hr of ethylene were continuously supplied to the tank, where polymerization was carried out at a temperature of 65° C. Hydrogen was continuously supplied so as to maintain the gas phase concentration in the polymerization tank 1 at 4.0% by mole.

The propylene random copolymer thus obtained was subjected to pelletization and molding into film by the same method as described in Example 11.

The primary nature of the resulting polymer and the properties of the film obtained therefrom are presented in Table 6.

TABLE 6

|  |  |  | Example 11 | Comp. Ex. 15 | Comp. Ex. 16 |
|---|---|---|---|---|---|
| GPC molecular weight distribution |  |  | 2 | 2 | 3.9 |
| Melting point peak | Homo1 | (° C.) | 149 | 149 | — |
|  | Homo2 | (° C.) | 141 | — | — |
|  | Random1 | (° C.) | 110 | 113 | 135 |

TABLE 6-continued

|  |  | Example 11 | Comp. Ex. 15 | Comp. Ex. 16 |
|---|---|---|---|---|
| MFR | (g/10 min) | 7 | 7 | 7 |
| Amount of homopolymerization | (wt %) | 49 | 3 | 0 |
| Amount of random polymerization | (wt %) | 51 | 97 | 100 |
| Nature of powder (particle) |  | ◯ Good | ◯ Good | ◯ Good |
| Presence or absence of stained element in TEM photo (≧3 μm) |  | Absent | Absent | Present |
| Amount of $nC_{10}$-soluble fraction | (wt %) | 1.8 | 1.5 | 10 |
| Haze | (%) | 1.1 | 1.1 | 0.9 |
| Heat seal strength (120° C.) | (N/15 mm) | 11.2 | 12 | 5 |
| Half crystallization time (105° C.) | min | 1.5 | 41 | 2.7 |

EXAMPLE 12

A propylene random copolymer (A1) (ethylene content=1.5% by weight, melting point=138° C.) obtained as a result of modifying the polymerization conditions used in Example 6, such as the amount of ethylene fed to the actual polymerization, and a propylene random copolymer (B1) (ethylene content=5.1% by weight, melting point=115° C.) were blended in a ratio of 50 parts by weights to 50 parts by weight, and then the blend was used to prepare a pellet according to the above-described molding/processing method [a1] pelletization method. The resulting pellet was used to produce a film having a thickness of 30 μm according to the above-described molding/processing method [a2] film molding method. The nature of the propylene resin composition and the film properties are presented in Table 7.

EXAMPLE 13

The entire process was carried out in the same manner as in Example 12, except that the blending ratio of the propylene random copolymers (A1) and (B1) used in Example 12 was changed to (A1):(B1)=30:70. The measured properties of the resulting pellet and the film are presented in Table 7.

EXAMPLE 14

The entire process was carried out in the same manner as in Example 12, except that the blending ratio of the propylene random copolymer (A1) used in Example 12, and a propylene random copolymer (B2) (ethylene content=5.7% by weight, melting point=110° C.) obtained as a result of modifying the polymerization conditions of Example 6, such as the amount of ethylene fed to the actual polymerization, was changed to (A1):(B2)=50:50. The measured properties of the resulting pellet and the film are presented in Table 7.

EXAMPLE 15

The entire process was carried out in the same manner as in Example 12, except that the blending ratio of a propylene random copolymer (A2) (ethylene content=0% by weight, melting point=147° C.) obtained as a result of modifying the polymerization conditions of Example 6, such as the amount of ethylene fed to the actual polymerization, and the propylene random copolymer (B1) used in Example 12 was changed to (A2):(B1)=20:80. The measured properties of the resulting pellet and the film are presented in Table 7.

COMPARATIVE EXAMPLE 17

The entire process was carried out in the same manner as in Example 12, except that only the propylene random copolymer (A1) used in Example 12 was used in an amount of 100 parts by weight. The measured properties of the resulting pellet and film are presented in Table 7.

COMPARATIVE EXAMPLE 18

The entire process was carried out in the same manner as in Example 12, except that a propylene random copolymer (A3) (ethylene content=1.4% by weight, melting point=138° C.) obtained as a result of modifying the polymerization conditions of Comparative Example 4, such as the amount of ethylene fed to the actual polymerization, and a propylene random copolymer (B3) (ethylene content=4.9% by weight, melting point=115° C.) were blended in a ratio of 50 parts by weight to 50 parts by weight. The measured properties of the resulting pellet and film are presented in Table 7.

COMPARATIVE EXAMPLE 19

The entire process was carried out in the same manner as in Example 12, except that only the propylene random copolymer (A4) (ethylene content=3.0% by weight, 1-butene content=1.8% by weight, melting point=139° C.) obtained as a result of modifying the amounts of ethylene and 1-butene fed to the actual polymerization of Comparative Example 3 was used in an amount of 100 parts by weight. The measured properties of the resulting pellet and film are presented in Table 7.

TABLE 7

|  |  | (Unit) | Ex. 12 | Ex. 13 | Ex. 14 | Ex. 15 | Comp. Ex. 17 | Comp. Ex. 18 | Comp. Ex. 19 |
|---|---|---|---|---|---|---|---|---|---|
|  | Metallocene compound | — | m1 | m1 | m1 | m1 | m1 | m2 | ZN |
| Comp. A | Melting point | ° C. | 138 | 138 | 138 | 147 | 138 | 138 | 139 |
|  | Distribution | wt % | 50 | 30 | 50 | 20 | 100 | 50 | 100 |

TABLE 7-continued

|  |  | (Unit) | Ex. 12 | Ex. 13 | Ex. 14 | Ex. 15 | Comp. Ex. 17 | Comp. Ex. 18 | Comp. Ex. 19 |
|---|---|---|---|---|---|---|---|---|---|
| Comp. B | Melting point | °C. | 115 | 115 | 110 | 115 | — | 115 | — |
|  | Distribution | wt % | 50 | 70 | 50 | 80 | — | 50 | — |
|  | MFR | g/10 min | 7 | 8 | 7 | 8 | 7 | 7 | 7 |
|  | Crystallization rate (105° C.) | min | 2.9 | 4.6 | 3.5 | 3.2 | 2.4 | 8.1 | 2.6 |
|  | Amount of $nC_{10}$-soluble fraction | wt % | 0.9 | 1.0 | 1.6 | 1.5 | 0.5 | 3.5 | 6.1 |
| Haze | Initial | % | 0.9 | 0.8 | 0.8 | 0.7 | 0.9 | 0.7 | 0.9 |
|  | 80° C., after 7 days | % | 1.1 | 1.2 | 1.2 | 1.3 | 1 | 10.5 | 3.4 |
|  | ΔHaze | % | 0.2 | 0.4 | 0.4 | 0.6 | 0.1 | 9.8 | 2.5 |
|  | Heat seal strength (120° C.) | N/15 mm | 2.5 | 3 | 4.1 | 3.2 | 1.3 | 2.4 | 1.2 | m1: Diphenylmethylene(3-t-butyl-5-methylcyclopentadienyl) (2,7-di-t-butylfluorenyl)zirconium dichloride
m2: Dimethylsilylenebis-(2-methyl-4-phenylindenyl)zirconium dichloride
ZN: Ziegler-Natta catalyst

EXAMPLE 16

A pellet was produced by using 100 parts by weight of a propylene random copolymer (ethylene content=4.5% by weight, 1-butene content=1.5% by weight, melting point 115° C.) obtained as a result of adding 1-butene and also modifying the polymerization conditions of Example 6, such as the amount of ethylene fed to the actual polymerization, according to the above-described molding/processing method [a1] pelletization method. The resulting pellet was used to produce a film having a thickness of 30 μm according to the above-described molding/processing method [a2] film molding method. The nature of the propylene polymer pellet and the film properties are presented in Table 8.

EXAMPLE 17

The entire process was carried out in the same manner as in Example 16, except that 100 parts by weight of a propylene random copolymer (ethylene content=5.1% by weight, melting point=115° C.) obtained as a result of modifying the polymerization conditions of Example 6, such as the amount of ethylene fed to the actual polymerization was used. The measured properties of the resulting pellet and film are presented in Table 8.

COMPARATIVE EXAMPLE 20

The entire process was carried out in the same manner as in Example 16, except that 100 parts by weight of a propylene random copolymer (ethylene content=5.2% by weight, melting point=115° C., MFR=8 g/10 min) obtained as a result of modifying the polymerization conditions of Comparative Example 4, such as the amount of ethylene fed to the actual polymerization was used. The measured properties of the resulting pellet and film are presented in Table 8.

COMPARATIVE EXAMPLE 21

The entire process was carried out in the same manner as in Example 16, except that 100 parts by weight of a propylene random copolymer(ethylene content=4.0% by weight, 1-butene content=2.5% by weight, melting point=131° C.) obtained as a result of modifying the polymerization conditions of Comparative Example 3, such as the amounts of ethylene and 1-butene fed to the actual polymerization was used. The measured properties of the resulting pellet and film are presented in Table 8.

TABLE 8

|  |  |  | Example 16 | Example 17 | Comp. Ex. 20 | Comp. Ex. 21 |
|---|---|---|---|---|---|---|
|  | Metallocene compound |  | m1 | m1 | m2 | ZN |
|  | Ethylene content | wt % | 4.5 | 5.1 | 5.2 | 4 |
|  | Butene content | wt % | 1.5 | 0 | 0 | 2.5 |
|  | MFR | g/10 min | 8 | 7 | 8 | 7 |
|  | Melting point | °C. | 115° C. | 115° C. | 115° C. | 131° C. |
|  | Half crystallization time (105° C.) | min | 40 | 37 | 45 | 8 |
|  | Amount eluted with n-decane | wt % | 1.3 | 1.7 | 5.9 | 8 |
| Haze | Initial | % | 0.6 | 0.7 | 0.6 | 0.8 |
|  | 80° C., after 7 days | % | 1.4 | 1.6 | 38.1 | 4.1 |
|  | ΔHaze | % | 0.8 | 0.9 | 37.5 | 3.3 |

TABLE 8-continued

|  |  | Example 16 | Example 17 | Comp. Ex. 20 | Comp. Ex. 21 |
|---|---|---|---|---|---|
| Heat seal strength (115° C.) | N/15 mm | 7 | 7.2 | 6.8 | 1.5 |
| Heat seal temperature[note] | ° C. | 115 | 114 | 118 | 127 | m1: Diphenylmethylene(3-tert-butyl-5-methylcyclopentadienyl) (2,7-di-tert-butylfluorneyl) zirconium dichloride
m2: Dimethylsilylenebis-(2-methyl-4-phenylindenyl)zirconium dichloride
ZN: Ziegler-Natta catalyst
[note]Minimum heat seal temperature required to exhibit heat seal strength of 7 N/15 mm

EXAMPLE 18

100 parts by weight of a propylene random copolymer (ethylene content=5.1% by weight, melting point=115° C.) obtained as a result of modifying the polymerization conditions of Example 6, such as the amount of ethylene fed to the actual polymerization, was used to produce a pellet according to the above-described molding/processing method [a1] pelletization method.

The resulting pellet was press molded to produce a sheet having a thickness of 0.4 mm. For the pressing conditions, the pellet was preheated at 230° C. for 6 minutes and pressed to produce a melt sheet, and then cooled at 30° C. for 2 minutes. The sheet was cut to a predetermined size and subjected to uniaxial stretching using a KAROIV of Bruckner Maschinenbau GmbH. For the stretching conditions, uniaxial stretching was carried out at a rate of 0.6 m/min after preheating at 90° C. for 30 seconds. The drawing ratio was 5 folds. The results for the properties of the resulting pellet thus obtained and the film shrinkage rate are summarized in Table 9.

EXAMPLE 19

The entire process was carried out in the same manner as in Example 18, except that 100 parts by weight of a resin composition comprising 70 parts by weight of the propylene random copolymer used in Example 18 and 30 parts by weight of a petroleum resin (Arakawa Chemical Industries, Ltd., Arkon P-140) was used. The results for the properties of the resulting pellets and the film shrinkage rate are summarized in Table 9.

COMPARATIVE EXAMPLE 22

The entire process was carried out in the same manner as in Example 18, except that 100 parts by weight of a propylene random copolymer (ethylene content=5.2% by weight, melting point=115° C., MFR=2.3 g/10 min) obtained as a result of modifying the polymerization conditions of Comparative Example 4, such as the amount of ethylene fed to the actual polymerization was used. The results for the properties of the resulting pellet and the film shrinkage rate are summarized in Table 9.

COMPARATIVE EXAMPLE 23

The entire process was carried out in the same manner as in Example 18, except that 100 parts by weight of a resin composition comprising 70 parts by weight of the propylene polymer used in Comparative Example 22 and 30 parts by weight of a petroleum resin (Arakawa Chemical Industries, Ltd., Arkon P-140) was used. The results for the properties of the resulting pellet and the film shrinkage rate are summarized in Table 9.

COMPARATIVE EXAMPLE 24

The entire process was carried out in the same manner as in Example 18, except that 100 parts by weight of a propylene random copolymer (ethylene content=4.0% by weight, melting point=139° C.) obtained as a result of modifying the polymerization conditions of Comparative Example 3, such as the amount of ethylene fed to the actual polymerization was used. The results for the properties of the resulting pellet and the film shrinkage rate are summarized in Table 9.

COMPARATIVE EXAMPLE 25

The entire process was carried out in the same manner as in Example 18, except that 100 parts by weight of a resin composition comprising 70 parts by weight of the propylene random polymer used in Comparative Example 24 and 30 parts by weight of a petroleum resin (Arakawa Chemical Industries, Ltd., Arkon P-140) was used. The results for the properties of the resulting pellet and the film shrinkage rate are summarized in Table 9.

TABLE 9

|  | (Unit) | Example 18 | Example 19 | Comp. Ex. 22 | Comp. Ex. 23 | Comp. Ex. 24 | Comp. Ex. 25 |
|---|---|---|---|---|---|---|---|
| Metallocene compound | — | m1 | m1 | m2 | m2 | ZN | ZN |
| Petroleum resin | %[note] | — | 30% | — | 30% | — | 30% |
| MFR | g/10 min | 2 | — | 2.3 | — | 2.2 | — |
| Melting point | ° C. | 115 | — | 115 | — | 139 | — |
| Mw/Mn | — | 2.1 | — | 2.2 | — | 4.5 | — |
| Amount of n-decane-soluble fraction | wt % | 1.2 | — | 4.5 | — | 6.2 | — |

TABLE 9-continued

| | (Unit) | Example 18 | Example 19 | Comp. Ex. 22 | Comp. Ex. 23 | Comp. Ex. 24 | Comp. Ex. 25 |
|---|---|---|---|---|---|---|---|
| Mw/Mn of n-decane-soluble fraction | — | 2.9 | — | 2.8 | — | 4.8 | — |
| Heat shrinkage rate | 90° C. | % | 40 | 50 | 37 | 46 | 25 | 40 |
| | 80° C. | % | 25 | 35 | 25 | 30 | 15 | 25 |
| | 60° C. | % | 7 | 10 | 6 | 8 | 6 | 7 |
| Natural shrinkage rate | 40° C. | % | 1.8 | 1.9 | 2.1 | 2.2 | 3.5 | 3.8 | m1: Diphenylmethylene(3-t-butyl-5-methylcyclopentadienyl) (2,7-di-t-butylfluorneyl)zirconium dichloride
m2: Dimethylsilylenebis-(2-methyl-4-phenylindenyl)zirconium dichloride
ZN: Ziegler-Natta catalyst
[note)]Represents the content (wt %) in the composition (e.g., 30% implies that 30 parts by weight of the petroleum resin is blended with 70 parts by weight of the propylene polymer.)

EXAMPLE 20

A propylene random copolymer (CXS=0.5% by weight, melting point=136° C., MFR=15 g/10 min) was obtained as a result of modifying the polymerization conditions of Example 1, such as the amount of ethylene fed to the actual polymerization. This random copolymer was molded into a film in a single layer casting machine [single layer film casting machine SE-65-30 by Toshiba Machine Co., Ltd.], and simultaneously one surface of the film was subjected to corona treatment to produce a surface-treated single layer film molded product. In addition, the melt temperature of the resin was set to 250° C., and the chill roll temperature was set to 12° C. The intensity of the corona discharge was adjusted to result in a film thickness of 30 μm and a film surface tension immediately after molding of 45 mN/m. Measurement was made on the change of the surface tension over time of the surface-treated single layer film molded product. The results are presented in Table 10.

COMPARATIVE EXAMPLE 26

A propylene random copolymer (CXS=6.6% by weight, melting point=139° C., MFR=7 g/10 min) was obtained as a result of modifying the polymerization conditions of Comparative Example 3, such as the amounts of ethylene and 1-butene fed to the actual polymerization. This random copolymer was molded into a film in the same manner as in Example 20, and the change of surface tension over time was measured. The results are presented in Table 10.

COMPARATIVE EXAMPLE 27

A propylene random copolymer (CXS=6.9% by weight, melting point=136° C., MFR=15 g/10 min) was obtained as a result of modifying the polymerization conditions of Comparative Example 3, such as the amounts of ethylene and 1-butene fed to the actual polymerization. This random copolymer was molded into a film in the same manner as in Example 20, and the change of surface tension over time was measured. The results are presented in Table 10.

TABLE 10

| | | Example 20 | Comp. Ex. 26 | Comp. Ex. 27 |
|---|---|---|---|---|
| Amount of xylene-soluble fraction (CXS) | wt % | 0.5 | 6.6 | 6.9 |
| Melting point (Tm) | ° C. | 136 | 139 | 136 |
| MFR | g/10 min | 15 | 7 | 15 |

TABLE 10-continued

| | | | Example 20 | Comp. Ex. 26 | Comp. Ex. 27 |
|---|---|---|---|---|---|
| Young's modulus (23° C.) | MD | MPa | 930 | 700 | 680 |
| | TD | | 860 | 710 | 670 |
| | Average | | 895 | 705 | 675 |
| | $\alpha \times Tm - 500$[note1] | | 860 | 890 | 860 |
| Young's modulus (60° C.) | MD | MPa | 200 | 160 | 140 |
| | TD | | 170 | 150 | 150 |
| | Average | | 185 | 155 | 145 |
| | $\alpha \times Tm - 500$[note1] | | 180 | 195 | 180 |
| Young's modulus (100° C.) | MD | MPa | 80 | 40 | 30 |
| | TD | | 60 | 40 | 40 |
| | Average | | 70 | 40 | 35 |
| | $\alpha \times Tm - 500$[note1] | | 44 | 56 | 44 |
| Surface tension | Immediately after molding [=σ(0)] | mN/m | 45 | 45 | 45 |
| | After 1 day | | 44 | 43 | 43 |
| | After 2 days | | 42 | 37 | 36 |
| | After 3 days | | 42 | 37 | 36 |
| | After 5 days | | 41 | 37 | 35 |
| | After 7 days [=σ(7)] | | 41 | 36 | 34 |
| | After 13 days | | 40 | 35 | 34 |
| [σ(0) − σ(7)]/σ(0)[note2] | | % | 11 | 22 | 24 |

[note1)]Value of the right-hand side of (Eq-6) (Calculated value). α is a proportional constant depending on the measuring temperature, for example, α = 10 at 23° C., α = 5 at 60° C., α = 4 at 100° C.
[note2)]Value of the left-hand side of (Eq-5) (Calculated value).

INDUSTRIAL APPLICABILITY

The propylene random copolymer of the present invention is characterized in that it has a low melting point and a smaller amount of the n-decane-soluble fraction (i.e., a smaller amount of the low-crystalline fraction). This propylene random copolymer can be used to obtain various useful molded products such as various films and sheets having anti-blocking property and less deterioration in transparency after heat treatment, and highly transparent injection molded articles, blow molded products, injection blow molded products and the like.

The invention claimed is:

1. A propylene random copolymer particle having a trilayer structure consisting of a first skin layer [L1] that is present at the outermost crust, a second skin layer [L2] that is internally contacting with the first skin layer, and a core [L3] that is present inner to the second skin layer,
   wherein, in the transmission electron microscope (TEM) photograph (magnification×4000) of an ultrathin section of the core [L3] after metal oxide staining, no stained component which has a particle diameter of 3 μm or greater is observed, and wherein the propylene random copolymer satisfies the following requirements [1] to [4]:

[1] the concentration (Pa, % by mole) of a constituent of the copolymer derived from propylene (a), and the concentration (Px, % by mole) of a constituent of the copolymer derived from at least one olefin selected from ethylene (b) and α-olefins having 4 to 20 carbon atoms (c), each of which is contained in the propylene random copolymer, satisfy the following relational expressions (Eq-1) to (Eq-3):

$$85 \leq Pa < 100 \quad \text{(Eq-1)}$$

$$0 < Px \leq 15 \quad \text{(Eq-2)}$$

$$Pa + Px = 100 \quad \text{(Eq-3)};$$

[2] the concentration (Pa, % by mole) of the constituent of the copolymer derived from propylene (a) contained in the propylene random copolymer, and the melting point (Tm) measured with a differential scanning calorimeter satisfy the following relational expression (Eq-4):

$$135 - 4 \times (100 - Pa) < Tm < 165 - 4 \times (100 - Pa) \quad \text{(Eq-4)};$$

[3] the total amount of 2,1-bonded and 1,3-bonded non-stereoregular fractions is less than or equal to 0.2% by mole; and

[4] the amount of the n-decane ($nC_{10}$)-soluble fraction is less than or equal to 2.0% by weight.

2. The propylene polymer particle according to claim 1, wherein the first skin layer [L1] is made of polyethylene, the second skin layer [L2] is made of a polypropylene having a melting point (Tm) of 130° C. or higher as measured by DSC, and the core [L3] is made of a propylene homopolymer, or a copolymer obtained from propylene and at least one olefin selected from ethylene and an α-olefin having 4 or more carbon atoms.

3. The propylene polymer particle according to claim 2, wherein the first skin layer has an intrinsic viscosity [η] of 3 (g/dl) or greater and a density of 910 (kg/m³) or greater, and the second skin layer has an intrinsic viscosity [η] in the range of 0.5 to 5 (g/dl).

4. The propylene polymer particle according to claim 1, which has a melting point (Tm) of 140° C. or lower.

5. The propylene polymer particle according to claim 4, wherein the first skin layer [L1] is made of polyethylene, the second skin layer [L2] is made of a polypropylene having a melting point (Tm) of 130° C. or higher as measured by DSC, and the core [L3] is made of a propylene homopolymer, or a copolymer obtained from propylene and at least one olefin selected from ethylene and an α-olefin having 4 or more carbon atoms.

6. A molded product obtained by molding the propylene polymer particle according to any one of claims 1, 2, 3, 4, and 5.

7. A pellet obtained by melting and kneading the propylene polymer particle according to any one of claims 1, 2, 3, 4, and 5.

8. A pellet obtained by adding at least one additive, selected from the group consisting of anti-oxidants, ultraviolet absorbers, antistatic agents, nucleating agents, lubricants, fire retardants, antiblocking agents, coloring agents, inorganic or organic fillers, and synthetic resins, to the propylene polymer particle according to any one of claims 1, 2, 3, 4, and 5 to form a mixture, and then melting, kneading, and pelletizing said mixture.

9. A molded product obtained by molding the pellet according to claim 7.

10. The molded product according to claim 6 or 9, which is a sealant film, a shrink film or a metal-deposited film.

11. A molded product obtained by molding the pellet according to claim 8.

12. A propylene random copolymer particle having a trilayer structure comprising a first skin layer [L1] that is present at the outermost crust, a second skin layer [L2] that is internally contacting with the first skin layer, and a core [L3] that is present inner to the second skin layer, wherein, in the transmission electron microscope (TEM) photograph (magnification×4000) of an ultrathin section of the core [L3] after metal oxide staining, no stained component which has a particle diameter of 3 μm or greater is observed, and wherein the propylene random copolymer satisfies the following requirements [1] to [4]:

[1] the concentration (Pa, % by mole) of a constituent of the copolymer derived from propylene (a), and the concentration (Px, % by mole) of a constituent of the copolymer derived from at least one olefin selected from ethylene (b) and α-olefins having 4 to 20 carbon atoms (c), each of which is contained in the propylene random copolymer, satisfy the following relational expressions (Eq-1) to (Eq-3):

$$85 \leq Pa < 100 \quad \text{(Eq-1)}$$

$$0 < Px \leq 15 \quad \text{(Eq-2)}$$

$$Pa + Px = 100 \quad \text{(Eq-3)};$$

[2] the concentration (Pa, % by mole) of the constituent of the copolymer derived from propylene (a) contained in the propylene random copolymer, and the melting point (Tm) measured with a differential scanning calorimeter satisfy the following relational expression (Eq-4):

$$135 - 4 \times (100 - Pa) < Tm < 165 - 4 \times (100 - Pa) \quad \text{(Eq-4)};$$

[3] the total amount of 2,1-bonded and 1,3-bonded non-stereoregular fractions is less than or equal to 0.2% by mole; and

[4] the amount of the n-decane ($nC_{10}$)-soluble fraction is less than or equal to 2.0% by weight.

13. A method for preparing a propylene polymer according to any one of claims 1, 2, 3, 4, and 5, wherein the following three processes [P-1], [P-2] and [P-3] are sequentially carried out in the presence of a metallocene catalyst:

Process [P-1]: Process for preparing a polymer precursor [$P_1$] by polymerizing ethylene;

Process [P-2]: Process for preparing a prepolymer [$P_2$] by polymerizing propylene in an amount of 50 to 20,000 g/g-cat in the presence of the polymer precursor [$P_1$] at a temperature of 5 to 40° C.; and Process [P-3]: Process for preparing a propylene polymer [$P_3$] by homopolymerizing propylene or by copolymer izing propylene with at least one olefin selected from ethylene and an α-olefin having 4 or more carbon atoms in the presence of the prepolymer [P$_2$].

14. The method for preparing a propylene polymer particle according to claim 13, wherein the polymer precursor [P$_1$] prepared in the process [P-1] is washed with an aliphatic or alicyclic hydrocarbon having 5 to 12 carbon atoms.

15. The method for preparing a propylene polymer particle according to claim 13, wherein at least one process selected from the process [P-1], process [P-2] and process [P-3] is carried out in the presence of a polyoxyalkylene compound represented by the following formula [I]:

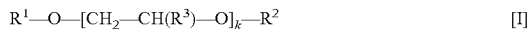

[I]

wherein R$^1$, R$^2$ and R$^3$ may be identical with or different from each other and are selected from a hydrogen atom, an alkyl group having 1 to 20 carbon atoms, an aryl group having 6 to 20 carbon atoms and an acyl group having 1 to 20 carbon atoms; and k represents the average number of the repeating units and is in the range of 1 to 100.

16. The method for preparing a propylene polymer particle according to claim 13, wherein the metallocene catalyst contains a metallocene compound represented by the following formula [II] as an essential component:

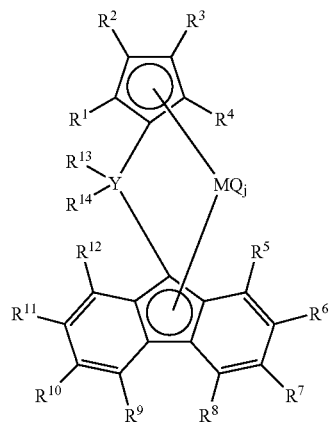

wherein R$^1$, R$^2$, R$^3$, R$^4$, R$^5$, R$^6$, R$^7$, R$^8$, R$^9$, R$^{10}$, R$^{11}$, R$^{12}$, R$^{13}$ and R$^{14}$ may be identical with or different from each other and are selected from hydrogen, a hydrocarbon group and a silicon-containing group; M is a transition metal belonging to Group 4; Y is a carbon atom or a silicon atom; Q may be selected from halogen, a hydrocarbon group, an anionic ligand and a neutral ligand capable of coordination with a lone electron pair, combined in identical or different combinations; and j is an integer of 1 to 4.

* * * * *